United States Patent
Benham et al.

(10) Patent No.: US 8,399,580 B2
(45) Date of Patent: Mar. 19, 2013

(54) ADDITIVES TO CHROMIUM CATALYST MIX TANK

(75) Inventors: Elizabeth A. Benham, Spring, TX (US); Max P. McDaniel, Bartlesville, OK (US); Kathy S. Collins, Bartlesville, OK (US)

(73) Assignee: Chevron Philips Chemical Company LP, The Woodlands, TX (US)

( * ) Notice: Subject to any disclaimer, the term of this patent is extended or adjusted under 35 U.S.C. 154(b) by 125 days.

(21) Appl. No.: 12/854,750

(22) Filed: Aug. 11, 2010

(65) Prior Publication Data

US 2012/0041160 A1    Feb. 16, 2012

(51) Int. Cl.
*C08F 4/00*    (2006.01)
*C08F 4/62*    (2006.01)
*C08F 4/24*    (2006.01)
*B01J 19/00*    (2006.01)
*B01J 19/18*    (2006.01)
*B01J 21/00*    (2006.01)
*B01J 27/057*    (2006.01)
*B01J 29/04*    (2006.01)
*B01J 21/16*    (2006.01)
*B01J 21/18*    (2006.01)
*G05D 23/00*    (2006.01)

(52) U.S. Cl. .......... 526/90; 526/105; 526/106; 422/131; 422/135; 422/110; 422/225; 502/100; 502/256; 502/320; 502/242; 502/210; 502/84; 502/104; 502/103; 502/150; 502/228; 502/217; 502/232; 502/350; 502/349; 502/204; 502/60; 502/263; 502/180; 502/80

(58) Field of Classification Search .................... 526/90, 526/105, 106; 422/131, 135, 110, 225; 502/100, 502/256, 320, 242, 210, 84, 104, 103, 150, 502/228, 217, 232, 350, 349, 204, 60, 263, 502/180, 80, 198.1
See application file for complete search history.

(56) References Cited

U.S. PATENT DOCUMENTS

| | | | |
|---|---|---|---|
| 4,105,844 A | 8/1978 | McDaniel | |
| 4,151,122 A | 4/1979 | McDaniel et al. | |
| 4,169,926 A | 10/1979 | McDaniel | |
| 4,177,162 A | 12/1979 | McDaniel et al. | |
| 4,182,815 A | 1/1980 | McDaniel et al. | |
| 4,190,457 A | 2/1980 | McDaniel | |
| 4,194,073 A | 3/1980 | McDaniel | |
| 4,211,863 A | 7/1980 | McDaniel et al. | |
| 4,238,369 A | 12/1980 | McDaniel et al. | |
| 4,247,421 A | 1/1981 | McDaniel et al. | |
| 4,248,735 A | 2/1981 | McDaniel et al. | |
| 4,277,587 A | 7/1981 | McDaniel et al. | |
| 4,294,724 A | 10/1981 | McDaniel | |
| 4,295,997 A | 10/1981 | McDaniel et al. | |
| 4,297,460 A | 10/1981 | McDaniel et al. | |
| 4,299,731 A | 11/1981 | McDaniel et al. | |
| 4,301,034 A | 11/1981 | McDaniel | |
| 4,307,214 A | 12/1981 | McDaniel et al. | |

(Continued)

*Primary Examiner* — William Cheung

(74) *Attorney, Agent, or Firm* — Fletcher Yoder P.C.

(57) ABSTRACT

Systems and methods for the maintenance of active chromium-based catalysts and their use in polymerization processes are described. In one embodiment, a system for the introduction of multiple polymerization components to activate a chromium based catalyst within a mix tank is described. Other described features may include materials and methods to purify the liquid medium of a catalyst slurry so that the catalyst slurry maintains a high level of activity. The active chromium-based catalyst may provide polyolefins with a number of desirable properties in a reliable, consistent, and predictable manner.

17 Claims, 6 Drawing Sheets

U.S. PATENT DOCUMENTS

| | | |
|---|---|---|
| 4,325,839 A | 4/1982 | McDaniel |
| 4,333,860 A | 6/1982 | Hawley et al. |
| 4,339,559 A | 7/1982 | McDaniel |
| 4,347,161 A | 8/1982 | Dietz et al. |
| 4,357,451 A | 11/1982 | McDaniel |
| 4,364,839 A | 12/1982 | McDaniel et al. |
| 4,364,840 A | 12/1982 | McDaniel et al. |
| 4,364,841 A | 12/1982 | McDaniel et al. |
| 4,364,842 A | 12/1982 | McDaniel et al. |
| 4,364,854 A | 12/1982 | McDaniel et al. |
| 4,364,855 A | 12/1982 | McDaniel et al. |
| 4,368,301 A | 1/1983 | Hawley et al. |
| 4,368,303 A | 1/1983 | McDaniel |
| 4,369,295 A | 1/1983 | McDaniel |
| 4,378,306 A | 3/1983 | McDaniel et al. |
| 4,382,022 A | 5/1983 | McDaniel |
| 4,384,086 A | 5/1983 | McDaniel et al. |
| 4,397,761 A | 8/1983 | McDaniel et al. |
| 4,397,765 A | 8/1983 | McDaniel |
| 4,397,766 A | 8/1983 | Hawley et al. |
| 4,397,769 A | 8/1983 | McDaniel et al. |
| 4,398,004 A | 8/1983 | McDaniel et al. |
| RE31,390 E | 9/1983 | McDaniel et al. |
| 4,402,864 A | 9/1983 | McDaniel |
| 4,405,768 A | 9/1983 | McDaniel |
| RE31,443 E | 11/1983 | McDaniel et al. |
| 4,419,268 A | 12/1983 | McDaniel |
| 4,424,139 A | 1/1984 | McDaniel et al. |
| 4,424,320 A | 1/1984 | McDaniel |
| 4,434,280 A | 2/1984 | McDaniel et al. |
| 4,439,543 A | 3/1984 | McDaniel et al. |
| 4,442,274 A | 4/1984 | McDaniel et al. |
| 4,444,962 A | 4/1984 | McDaniel et al. |
| 4,444,963 A | 4/1984 | McDaniel et al. |
| 4,444,964 A | 4/1984 | McDaniel et al. |
| 4,444,966 A | 4/1984 | McDaniel |
| 4,444,968 A | 4/1984 | McDaniel et al. |
| 4,454,293 A | 6/1984 | McDaniel |
| 4,460,756 A | 7/1984 | McDaniel et al. |
| 4,472,519 A | 9/1984 | McDaniel |
| 4,477,586 A | 10/1984 | McDaniel |
| 4,481,302 A | 11/1984 | McDaniel et al. |
| 4,489,172 A | 12/1984 | McDaniel |
| 4,499,199 A | 2/1985 | McDaniel |
| 4,503,201 A | 3/1985 | McDaniel et al. |
| 4,504,638 A | 3/1985 | McDaniel et al. |
| 4,528,338 A | 7/1985 | McDaniel et al. |
| 4,535,070 A | 8/1985 | McDaniel et al. |
| 4,537,869 A | 8/1985 | McDaniel |
| 4,537,928 A | 8/1985 | Johnson et al. |
| 4,540,757 A | 9/1985 | McDaniel |
| 4,547,479 A | 10/1985 | Johnson et al. |
| 4,547,557 A | 10/1985 | McDaniel |
| 4,552,937 A | 11/1985 | McDaniel |
| 4,559,394 A | 12/1985 | McDaniel |
| 4,560,733 A | 12/1985 | Martin nee Sturdy et al. |
| 4,565,795 A | 1/1986 | Short et al. |
| 4,593,146 A | 6/1986 | Johnson et al. |
| 4,596,862 A | 6/1986 | McDaniel et al. |
| 4,619,980 A | 10/1986 | McDaniel et al. |
| 4,622,371 A | 11/1986 | McDaniel |
| 4,640,964 A | 2/1987 | Johnson et al. |
| 4,659,690 A | 4/1987 | McDaniel et al. |
| 4,663,403 A | 5/1987 | McDaniel |
| 4,681,266 A | 7/1987 | Mason et al. |
| 4,681,866 A | 7/1987 | McDaniel et al. |
| 4,690,990 A | 9/1987 | McDaniel et al. |
| 4,717,701 A | 1/1988 | McDaniel |
| 4,735,931 A | 4/1988 | McDaniel et al. |
| 4,803,253 A | 2/1989 | McDaniel et al. |
| 4,806,513 A | 2/1989 | McDaniel et al. |
| 4,818,800 A | 4/1989 | McDaniel et al. |
| 4,820,785 A | 4/1989 | McDaniel et al. |
| 4,843,133 A | 6/1989 | Short et al. |
| 4,855,271 A | 8/1989 | McDaniel et al. |
| 4,877,763 A | 10/1989 | McDaniel et al. |
| 4,900,704 A | 2/1990 | McDaniel et al. |
| 4,918,040 A | 4/1990 | McDaniel |
| 4,937,300 A | 6/1990 | McDaniel |
| 4,960,748 A | 10/1990 | Klendworth et al. |
| 4,966,951 A | 10/1990 | Benham et al. |
| 4,981,831 A | 1/1991 | Knudsen et al. |
| 4,988,657 A | 1/1991 | Martin et al. |
| 4,998,657 A | 3/1991 | Ramsay et al. |
| 5,001,204 A | 3/1991 | Klendworth et al. |
| 5,010,152 A | 4/1991 | McDaniel et al. |
| 5,021,379 A | 6/1991 | Martin et al. |
| 5,024,982 A | 6/1991 | Hawley et al. |
| 5,026,796 A | 6/1991 | McDaniel et al. |
| 5,032,651 A | 7/1991 | McDaniel et al. |
| 5,037,911 A | 8/1991 | McDaniel et al. |
| 5,043,514 A | 8/1991 | McDaniel et al. |
| 5,064,795 A | 11/1991 | McDaniel |
| 5,071,927 A | 12/1991 | Benham et al. |
| 5,075,394 A | 12/1991 | McDaniel et al. |
| 5,087,789 A | 2/1992 | McDaniel et al. |
| 5,104,837 A | 4/1992 | Hawley et al. |
| 5,104,839 A | 4/1992 | McDaniel et al. |
| 5,104,950 A | 4/1992 | Martin et al. |
| 5,115,053 A | 5/1992 | Knudsen et al. |
| 5,115,068 A | 5/1992 | Bailey et al. |
| 5,171,798 A | 12/1992 | McDaniel et al. |
| 5,171,801 A | 12/1992 | Martin et al. |
| 5,179,178 A | 1/1993 | Stacy et al. |
| 5,200,379 A | 4/1993 | McDaniel et al. |
| 5,208,309 A | 5/1993 | McDaniel et al. |
| 5,219,817 A | 6/1993 | McDaniel et al. |
| 5,219,962 A | 6/1993 | McDaniel et al. |
| 5,221,654 A | 6/1993 | McDaniel et al. |
| 5,221,655 A | 6/1993 | McDaniel et al. |
| 5,221,720 A | 6/1993 | McDaniel et al. |
| 5,237,025 A | 8/1993 | Benham et al. |
| 5,246,900 A | 9/1993 | McDaniel et al. |
| 5,274,056 A | 12/1993 | McDaniel et al. |
| 5,275,992 A | 1/1994 | Mitchell et al. |
| 5,276,114 A | 1/1994 | Hawley et al. |
| 5,283,301 A | 2/1994 | McDaniel et al. |
| 5,284,811 A | 2/1994 | Witt et al. |
| 5,284,926 A | 2/1994 | Benham et al. |
| 5,306,775 A | 4/1994 | Martin et al. |
| 5,319,029 A | 6/1994 | Martin et al. |
| 5,344,884 A | 9/1994 | Benham et al. |
| 5,362,825 A | 11/1994 | Hawley et al. |
| 5,364,915 A | 11/1994 | Benham et al. |
| 5,378,764 A | 1/1995 | Benham et al. |
| 5,382,738 A | 1/1995 | Reagen et al. |
| 5,399,522 A | 3/1995 | Ohori |
| 5,399,622 A | 3/1995 | Geerts et al. |
| 5,401,820 A | 3/1995 | McDaniel et al. |
| 5,436,305 A | 7/1995 | Alt et al. |
| 5,438,027 A | 8/1995 | Reagen et al. |
| 5,444,132 A | 8/1995 | Witt et al. |
| 5,451,645 A | 9/1995 | Reagen et al. |
| 5,459,203 A | 10/1995 | Geerts et al. |
| 5,486,584 A | 1/1996 | Badley et al. |
| 5,508,362 A | 4/1996 | Rollmann et al. |
| 5,576,263 A | 11/1996 | Badley et al. |
| 5,595,953 A | 1/1997 | McDaniel et al. |
| 5,599,887 A | 2/1997 | Badley et al. |
| 5,610,247 A | 3/1997 | Alt et al. |
| 5,624,877 A | 4/1997 | Bergmeister et al. |
| 5,627,247 A | 5/1997 | Alt et al. |
| 5,641,249 A | 6/1997 | McClelland |
| 5,641,842 A | 6/1997 | McDaniel et al. |
| 5,648,439 A | 7/1997 | Bergmeister et al. |
| 5,654,249 A | 8/1997 | Rollmann et al. |
| 5,786,431 A | 7/1998 | Reagen et al. |
| 5,866,661 A | 2/1999 | Benham et al. |
| 6,034,186 A | 3/2000 | Martin et al. |
| 6,037,433 A | 3/2000 | Martin et al. |
| 6,107,230 A | 8/2000 | McDaniel et al. |
| 6,162,936 A | 12/2000 | Alt et al. |
| 6,165,929 A | 12/2000 | McDaniel et al. |
| 6,174,981 B1 | 1/2001 | Bergmeister et al. |
| 6,194,526 B1 | 2/2001 | Benham et al. |
| 6,197,899 B1 | 3/2001 | Mitchell et al. |
| 6,201,077 B1 | 3/2001 | Bergmeister et al. |

| Patent | Date | Inventor |
|---|---|---|
| 6,204,346 B1 | 3/2001 | Bergmeister et al. |
| 6,255,413 B1 | 7/2001 | Benham et al. |
| 6,294,494 B1 | 9/2001 | McDaniel et al. |
| 6,300,271 B1 | 10/2001 | McDaniel et al. |
| 6,316,553 B1 | 11/2001 | McDaniel et al. |
| 6,329,476 B1 | 12/2001 | Martin et al. |
| 6,355,594 B1 | 3/2002 | McDaniel et al. |
| 6,376,415 B1 | 4/2002 | McDaniel et al. |
| 6,388,017 B1 | 5/2002 | McDaniel et al. |
| 6,391,816 B1 | 5/2002 | McDaniel et al. |
| 6,395,666 B1 | 5/2002 | McDaniel et al. |
| 6,403,734 B1 | 6/2002 | Alt et al. |
| 6,420,579 B1 | 7/2002 | Alt et al. |
| 6,465,586 B2 | 10/2002 | McDaniel et al. |
| 6,495,638 B2 | 12/2002 | McDaniel et al. |
| 6,518,376 B2 | 2/2003 | Benham et al. |
| 6,524,987 B1 | 2/2003 | Collins et al. |
| 6,525,148 B1 | 2/2003 | McDaniel et al. |
| 6,528,448 B1 | 3/2003 | Jensen et al. |
| 6,531,550 B1 | 3/2003 | McDaniel et al. |
| 6,538,077 B1 | 3/2003 | Shveima et al. |
| 6,548,441 B1 | 4/2003 | McDaniel et al. |
| 6,548,442 B1 | 4/2003 | McDaniel et al. |
| 6,569,960 B2 | 5/2003 | Bergmeister et al. |
| 6,573,344 B1 | 6/2003 | Hawley et al. |
| 6,576,583 B1 | 6/2003 | McDaniel et al. |
| 6,583,235 B1 | 6/2003 | Eilerts et al. |
| 6,613,712 B1 | 9/2003 | McDaniel et al. |
| 6,613,852 B2 | 9/2003 | McDaniel et al. |
| 6,617,403 B2 | 9/2003 | Sukhadia et al. |
| 6,627,707 B2 | 9/2003 | McDaniel et al. |
| 6,632,894 B1 | 10/2003 | McDaniel et al. |
| 6,642,324 B2 | 11/2003 | Bergmeister et al. |
| 6,653,416 B2 | 11/2003 | McDaniel et al. |
| 6,657,023 B2 | 12/2003 | Bergmeister et al. |
| 6,657,034 B2 | 12/2003 | Martin et al. |
| 6,667,274 B1 | 12/2003 | Hawley et al. |
| 6,713,572 B2 | 3/2004 | McDaniel et al. |
| 6,716,938 B2 | 4/2004 | Shveima et al. |
| 6,750,302 B1 | 6/2004 | McDaniel et al. |
| 6,828,268 B1 | 12/2004 | McDaniel et al. |
| 6,831,141 B2 | 12/2004 | McDaniel et al. |
| 6,833,338 B2 | 12/2004 | McDaniel et al. |
| 6,838,533 B2 | 1/2005 | McDaniel et al. |
| 6,855,781 B2 | 2/2005 | Bergmeister et al. |
| 6,858,687 B2 | 2/2005 | McDaniel et al. |
| 6,867,278 B2 | 3/2005 | McDaniel et al. |
| 6,875,835 B2 | 4/2005 | McDaniel et al. |
| 6,878,785 B2 | 4/2005 | McDaniel et al. |
| 6,887,819 B2 | 5/2005 | McDaniel et al. |
| 6,900,277 B2 | 5/2005 | Eilerts et al. |
| 6,908,971 B2 * | 6/2005 | Burns et al. .................. 526/90 |
| 6,936,667 B2 | 8/2005 | Jensen et al. |
| 6,977,235 B2 | 12/2005 | McDaniel et al. |
| 6,982,306 B2 | 1/2006 | Martin et al. |
| 6,984,603 B2 | 1/2006 | McDaniel et al. |
| 6,989,344 B2 | 1/2006 | Cann et al. |
| 6,992,032 B2 | 1/2006 | McDaniel et al. |
| 7,001,968 B2 | 2/2006 | McDaniel et al. |
| 7,022,781 B2 | 4/2006 | McDaniel et al. |
| 7,026,494 B1 | 4/2006 | Yang et al. |
| 7,041,617 B2 | 5/2006 | Jensen et al. |
| 7,041,753 B2 | 5/2006 | McDaniel et al. |
| 7,071,276 B2 | 7/2006 | McDaniel et al. |
| 7,094,857 B2 | 8/2006 | Sukhadia et al. |
| 7,109,277 B2 | 9/2006 | Hawley et al. |
| 7,112,643 B2 | 9/2006 | McDaniel et al. |
| 7,119,043 B2 | 10/2006 | Martin et al. |
| 7,119,153 B2 | 10/2006 | Jensen et al. |
| 7,148,298 B2 | 12/2006 | Jensen et al. |
| 7,163,906 B2 | 1/2007 | McDaniel et al. |
| 7,199,073 B2 | 4/2007 | Martin et al. |
| 7,202,313 B2 | 4/2007 | Jorgensen et al. |
| 7,208,441 B2 | 4/2007 | Benham et al. |
| 7,214,642 B2 | 5/2007 | McDaniel et al. |
| 7,230,128 B2 | 6/2007 | Alt et al. |
| 7,231,065 B2 | 6/2007 | Peach et al. |
| 7,247,594 B2 | 7/2007 | Jayaratne et al. |
| 7,271,124 B2 | 9/2007 | McDaniel et al. |
| 7,294,599 B2 | 11/2007 | Jensen et al. |
| 7,307,133 B2 | 12/2007 | McDaniel et al. |
| 7,308,172 B2 | 12/2007 | Hendriks et al. |
| 7,309,805 B2 | 12/2007 | Hope et al. |
| 7,312,283 B2 | 12/2007 | Martin et al. |
| 7,390,764 B2 | 6/2008 | McDaniel et al. |
| 7,417,097 B2 | 8/2008 | Yu et al. |
| 7,456,243 B2 | 11/2008 | Jensen et al. |
| 7,470,758 B2 | 12/2008 | Jensen et al. |
| 7,517,939 B2 | 4/2009 | Yang et al. |
| 7,534,842 B2 | 5/2009 | Jayaratne et al. |
| 7,547,754 B2 | 6/2009 | McDaniel et al. |
| 7,572,875 B2 | 8/2009 | Jensen et al. |
| 7,576,163 B2 | 8/2009 | Yang et al. |
| 7,589,044 B2 | 9/2009 | McDaniel et al. |
| 7,589,162 B2 | 9/2009 | Krishnaswamy et al. |
| 7,601,665 B2 | 10/2009 | McDaniel et al. |
| 7,615,510 B2 | 11/2009 | McDaniel et al. |
| 7,615,596 B2 | 11/2009 | Burns et al. |
| 7,619,047 B2 | 11/2009 | Yang et al. |
| 7,622,414 B2 | 11/2009 | McDaniel et al. |
| 7,625,982 B2 | 12/2009 | Martin et al. |
| 7,629,284 B2 | 12/2009 | Jensen et al. |
| 7,638,456 B2 | 12/2009 | McDaniel et al. |
| 7,652,160 B2 | 1/2010 | Yang et al. |
| 7,652,982 B1 | 1/2010 | Kovummal |
| 7,700,516 B2 | 4/2010 | McDaniel et al. |
| 7,732,542 B2 | 6/2010 | Yang et al. |
| 7,745,557 B2 | 6/2010 | McDaniel et al. |
| 7,763,561 B2 | 7/2010 | McDaniel et al. |
| 7,803,324 B2 * | 9/2010 | Burns et al. .................. 422/110 |
| 2003/0120002 A1 | 6/2003 | McDaniel et al. |
| 2003/0162651 A1 | 8/2003 | Collins et al. |
| 2004/0024160 A1 | 2/2004 | Bergmeister et al. |
| 2004/0087745 A1 | 5/2004 | Sukhadia et al. |
| 2004/0132932 A1 | 7/2004 | Secora et al. |
| 2005/0090629 A1 | 4/2005 | McDaniel et al. |
| 2005/0119423 A1 | 6/2005 | Bergman et al. |
| 2005/0131173 A1 | 6/2005 | McDaniel et al. |
| 2005/0137366 A1 | 6/2005 | McDaniel et al. |
| 2005/0154159 A1 | 7/2005 | DesLauriers et al. |
| 2005/0203261 A1 | 9/2005 | Sukhadia et al. |
| 2005/0288461 A1 | 12/2005 | Jensen |
| 2006/0020088 A1 | 1/2006 | Hope et al. |
| 2006/0079656 A1 | 4/2006 | DesLauriers et al. |
| 2006/0155082 A1 | 7/2006 | McDaniel et al. |
| 2006/0287447 A1 | 12/2006 | Yu et al. |
| 2007/0078238 A1 | 4/2007 | Burns et al. |
| 2008/0281063 A9 | 11/2008 | Sukhadia et al. |
| 2008/0287287 A1 | 11/2008 | McDaniel et al. |
| 2009/0054606 A1 | 2/2009 | Jensen et al. |
| 2009/0088318 A1 | 4/2009 | McDaniel et al. |
| 2009/0088543 A1 | 4/2009 | Yang et al. |
| 2009/0124768 A1 | 5/2009 | McDaniel et al. |
| 2009/0163681 A1 | 6/2009 | McDaniel et al. |
| 2009/0164046 A1 | 6/2009 | Benham et al. |
| 2009/0240010 A1 | 9/2009 | McDaniel et al. |
| 2009/0275710 A1 | 11/2009 | McDaniel et al. |
| 2009/0326168 A1 | 12/2009 | Burns et al. |
| 2010/0010174 A1 | 1/2010 | McDaniel et al. |
| 2010/0029872 A1 | 2/2010 | Jensen et al. |
| 2010/0041842 A1 | 2/2010 | Yang et al. |
| 2010/0048843 A1 | 2/2010 | Jensen et al. |
| 2010/0075840 A1 | 3/2010 | McDaniel et al. |
| 2010/0076167 A1 | 3/2010 | McDaniel et al. |
| 2010/0144910 A1 | 6/2010 | McDaniel et al. |
| 2010/0160579 A1 | 6/2010 | Yang et al. |

* cited by examiner

ADDITIVES TO CHROMIUM CATALYST MIX TANK

BACKGROUND

The present disclosure relates generally to methods and systems for the formation of catalyst slurry for eventual introduction into a polymerization reactor. More particularly, the presently disclosed systems and methods relate to techniques for increasing the activity, reliability, consistency and predictability of chromium-based olefin polymerization catalysts.

This section is intended to introduce the reader to aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As methods, processes, and equipment within chemical and petrochemical technologies advance, the higher-quality, lower cost materials and products that result become more and more prolific in our everyday lives. In particular, simple molecular building blocks (or monomers) may be brought together into longer chains (or polymers), through a chemical process called polymerization to yield these materials.

Polyolefins, a type of polymer widely consumed on an everyday basis, may be produced from various olefin monomers and additives. In typical polyolefin reaction processes, various components are added to a polymerization reactor to begin the polyolefin reaction process. These various components can include olefin feed components, diluent components, additives, and catalyst components. Upon introduction of the various components into a polymerization reactor, the polymerization reaction process begins. The polymerization reaction takes place within the polymerization reactor under a given set of reaction conditions. The controlled or measured reaction conditions within the polymerization reactor can include reaction temperature, reaction pressure, reactor residence time, and concentrations of the various components within the reactor, such as reactor solids, ethylene, hexene, hydrogen, co-catalysts, antistatic agents, electron donors, and inerts, such as ethane and propane.

In addition to the monomers that may be used, the variable reaction conditions under which the polymerization occurs may affect the various physical and mechanical properties of the obtained polyolefin. Depending upon the application and market in which the polyolefin is to be used, some physical properties that can be desired, depending on the product requirement and application, are molecular weight, molecular weight distribution, density, crystallinity, and rheology. Some mechanical properties that can be desired, depending on the product requirement and application, are modulus, tensile properties, impact properties, stress relaxation, creep, and elongation. Despite advances within polymerization technologies over the past few decades, consistently obtaining polyolefins with specific properties remains a difficult task, as precise control over polymerization reaction variables is among the more difficult hurdles associated with polyolefin production.

In conventional polyethylene loop reaction processes, the dry, solid catalyst is combined with olefin-free diluent in an unagitated vessel known as a mud chamber. The catalyst settles to form a catalyst mud, which is then directed to the polymerization reactor by a ball-check feeder system. Feed lines are directed into the polymerization reactor for the introduction of other reactor components including activators, dessicants, reducing agents, diluents, and the like. The other polymerization components are introduced directly into the reactor and are monitored using separate gauges, pumps, and dilution tanks for each.

Additionally, as various feed streams are introduced directly into the polymerization reactor, activating agents, reducing agents, newly formed catalyst poisons, and the like can be locally concentrated at the site of introduction. This may create local inhomogeneities in activity and random pockets of heating within the reactor. Within these local areas, unwanted side processes may occur which could have a significant negative impact on the overall performance of the reactor and the properties of the resultant polymer.

BRIEF DESCRIPTION OF THE DRAWINGS

Advantages of the present embodiments may become apparent upon reading the following detailed description and upon reference to the drawings in which.

DETAILED DESCRIPTION OF EMBODIMENTS

Figure 1:
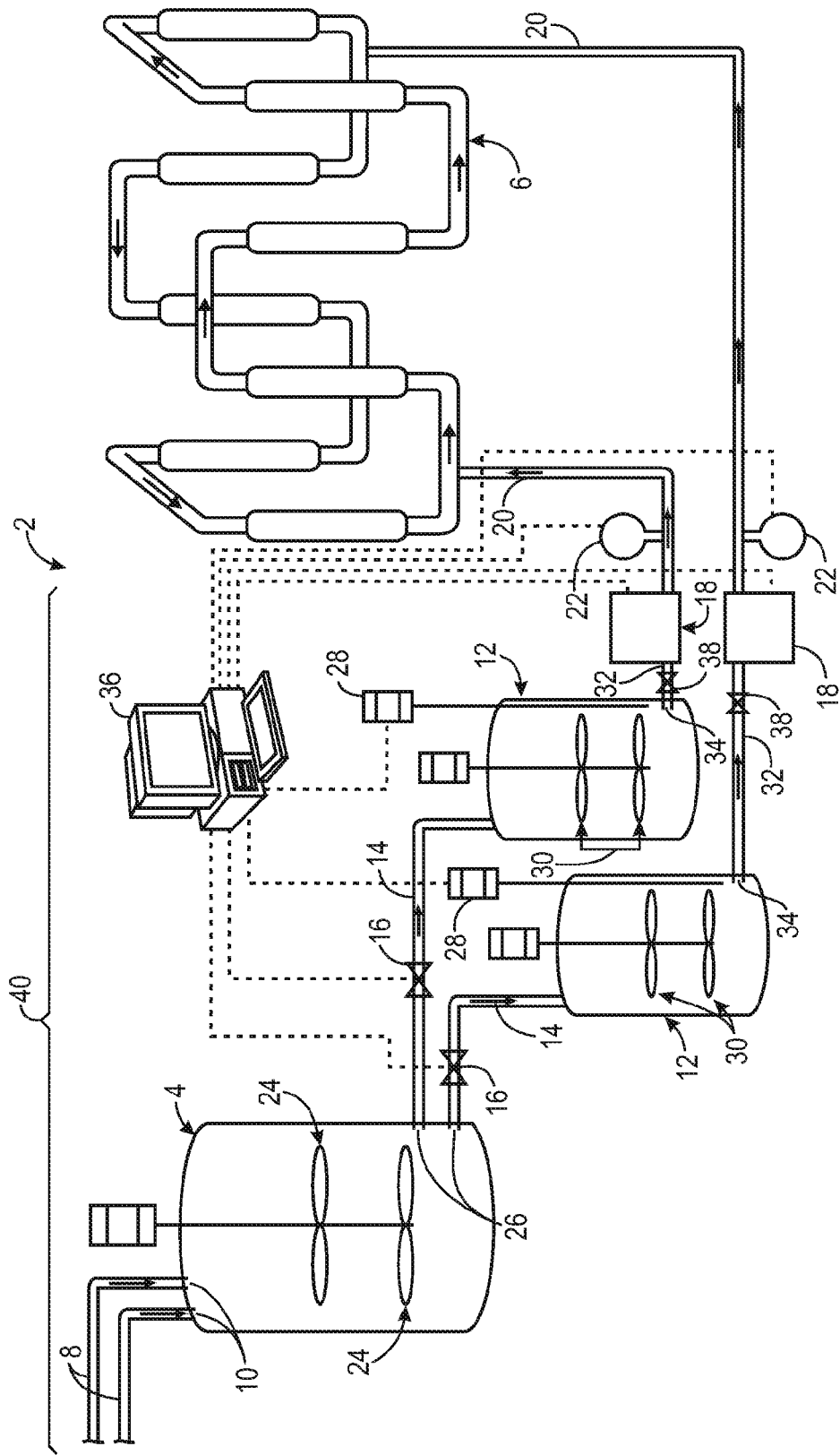
FIG. 1 is an illustration of a loop slurry reactor system, in accordance with various aspects of the present disclosure.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In an industry where billions of pounds of polyolefin product are produced per year, small incremental improvements, for example, in catalyst activity, monomer yield, energy efficiency, diluent recovery, capital modification, and so forth, can generate significant cost savings in the manufacture of polyolefins. Catalyst activity may be defined as the mass of polymer produced per the mass of catalyst utilized. For example, catalyst research has produced commercial catalysts with activity values that are orders of magnitude higher than those of two to three decades ago, resulting in a striking reduction in the amount of catalyst utilized per pound of polymer produced, and also reducing the amount of downstream processing (and equipment) used to deactivate and/or remove residual catalyst in the polymer product. Further advances in the processing and activation of the catalyst may result in increased polymerization rates, increased polyolefin production rate, and improved polyolefin consistency.

Despite existing systems and methods to control the feed of catalyst and polymer components to polymerization systems, it is now recognized that a need exists for improved systems and methods for maintaining the activity of catalyst components and controlling their introduction into a polymerization reactor. For example, it is now recognized that it can become a costly burden to controllably introduce various components into the reaction chamber. Further, it is recognized that a need exists for improved systems and methods to consistently and predictably produce a polymer.

Reactor conditions and the monomers used in a polymerization system may affect the efficiency of polymerization reactors and the properties of the polyolefin produced by the system. In addition, catalyst activity may also affect the properties of obtained polyolefins and the efficiency of polymerization reactors. To increase the activity of the catalyst, raw catalyst may be activated or converted (e.g., changed oxidation state) in a catalyst preparation process (e.g., in an activator vessel with an external furnace, or in a precontactor with an activator reagent) prior to its introduction directly into the polymerization reactor. The catalyst may also be converted within the actual polymerization reactor chamber by adding an activator, usually a metal alkyl. During the course of the polymerization reaction, the catalyst activity may be deleteriously affected as a result of a number of factors. More specifically, the control of catalyst activity and concentration within the reactor, mitigation of formed catalyst poisons, and control of local inhomogeneities benefits the overall polymerization process.

The present techniques are directed to the improvement of catalyst activity in polyolefin polymerization reactors. In particular, in accordance with present embodiments, the improvement of catalyst activity by treating catalysts with various additives within a mix tank, upstream of the run tank, prior to introduction to a polymerization reactor is initially discussed. It is now recognized that the use of a mix tank and various associated components is beneficial in ensuring catalyst amounts, activity, and reliability. For example, unlike systems which utilize precontactor or direct reactor injection features, the mix tank assembly according to present embodiments displays advantages such as pre-dilution and homogeneous catalyst activation, thus preventing inhomogeneities of various reactants within the polymerization apparatus that can occur if added after the run tank. Additionally, the capital burden of high-pressure pumps and valves needed for precontactors and similar direct reactor injection features is avoided. Accordingly, in the absence of a monomer, the mix tank may serve as a vessel to prepare an active catalyst slurry capable of polymerizing olefins with minimal byproduct formation. This may be particularly advantageous for polymerization processes requiring a minimal number of reactive species, such as processes used to produce homopolymers. The presently described methods and systems may also benefit high-throughput reactor systems that require minimal induction and low residence times, such as continuous-take off systems and multiple reactors in series. In addition, the treatment of a liquid medium of a catalyst slurry to remove catalyst poisons is discussed, which may be advantageous in maintaining catalyst activity and avoiding unwanted byproducts. Once the reliability of the catalyst activity is improved, polymerization processes using the catalyst slurry may reliably, consistently, and predictably produce polyolefins with a number of desirable properties.

The present techniques may be implemented in conjunction with a variety of polymerization reactions, such as may be carried out in different types of polymerization reactors. One such reactor for carrying out polymerization reactions is a loop slurry reactor system 2, as depicted in FIG. 1, which may be used to polymerize ethylene and other olefins. For simplicity, the loop slurry reactor system 2 will be discussed herein, though it is to be understood that the present techniques may be applied to other types of polymerization reactors utilizing catalyst slurries. Indeed, any type of polymerization reaction or reactor may benefit from the present techniques.

Referring to FIG. 1, the loop slurry reactor system 2 is shown according to various aspects and embodiments of the present disclosure. The loop slurry reactor system 2 includes a catalyst mix tank 4 where a batch of catalyst is mixed with diluents and various other polymerization components to form a catalyst slurry that may be used in a polymerization reactor 6. The mixing tank 4 may receive dry or concentrated catalyst, diluents, desiccants, additives, reducing agents and the like from one or a number of feed lines 8 and/or inlets 10. The mix tank 4 is fluidly connected to a number of run tanks (or storage tanks) 12 downstream of the mix tank 4 by way of first conduits 14. The first conduits 14 may have valves 16. The catalyst slurry may be carried through the first conduits 14 using one or more pumps 18 or partially by gravity. The run tanks 12 are also fluidly connected to the polymerization reactor 6 by way of a lead-in pipe or pipes 20. Flow meters 22 may monitor the flow of the catalyst slurry running through the lead-in pipe 20 and are positioned along the lead-in pipe 20 located between the one or more pumps 18 and the polymerization reactor 6.

The mixing tank 4 is typically larger than the run tanks 12 and is used to prepare large batches of catalyst slurry. The mixing tank 4 includes an agitator 24 that agitates the catalyst slurry. In FIG. 1, the agitator 24 is an impeller. The impellers 24 can maintain the catalyst slurry at an essentially homogeneous or solid-to-liquid weight ratio throughout the mixing tank 4.

The first conduits 14 extend out of the mixing tank 4 and deliver the catalyst slurry to the run tanks 12. The first conduits 14 can have inlets 26 that are positioned near the bottom of the mixing tank 4 such that the first conduits 14 can still draw catalyst slurry out of the mixing tank 4 when the level of the catalyst slurry is low within the mixing tank 4. The impellers 24 may be located proximate the bottom tangent of the mixing tank 4 to produce a homogeneous catalyst slurry even at low tank levels. Also, the inlets 26 of the first conduits 14 may be located at points in the mixing tank 4 proximate at least one impeller 24 in order that the first conduits 14 draw catalyst slurry that is essentially homogeneous. The catalyst slurry in the mixing tank 4 may be subject to a higher pressure or may be located at a higher elevation than the catalyst slurry in the run tanks 12 such that the catalyst slurry is pushed from the mixing tank 4 to the run tanks 12 through the first conduits 14.

Each first conduit 14 carries catalyst slurry past the respective valve 16 to the respective run tank 12. While the mixing tank 4 is in the process of creating a batch of catalyst slurry, the valve 16 may be closed so that no catalyst slurry flows from the mixing tank 4 to the run tank 12. The run tank 12 can include a level indicator 28 that may include a computer or other controller and that may be electrically connected to the valve 16 to facilitate measurement and control of the level of the catalyst slurry in the run tank 4. When the level of the catalyst slurry in the run tank 12 is low, the level indicator 28 may signal the valve 16 to open the first conduit 14. The catalyst slurry then flows into the run tank 12 until the run tank 12 contains a desired level of catalyst slurry. The level indicator 28 may then signal the valve 16 to close the first conduit such that no more catalyst slurry enters the run tank 12. Therefore, between batch mixings of catalyst slurry in the mixing tank 4, a large enough batch of catalyst slurry can be drawn from the mixing tank 4 to the run tank 12 such that the run tank 12 will not run out of catalyst slurry during the time when the mixing tank 4 is making a new batch of catalyst slurry.

Once the run tanks 12 have received a batch of catalyst slurry from the mixing tank 4, the run tanks 12 may agitate the catalyst slurry with impellers 30 similar to those used in the mixing tank 4 or with other features for agitating. The impeller 30 may be employed to constantly agitate the catalyst slurry such that the catalyst slurry has an essentially homogeneous catalyst-to-diluent weight ratio (or solid-to-liquid weight ratio) throughout the run tank 12.

A second conduit 32 extends out of the run tank 12 and delivers a continuous flow of the catalyst slurry to the pumps 18. Each second conduit 32 can have an inlet 34 that is positioned near the bottom of a run tank 12 such that the second conduit 32 can still draw catalyst slurry out of the run tank 12 when the level of the catalyst slurry within the run tank 12 is low. The impellers 30 may be located proximate the bottom tangent of the run tank 12 to produce an essentially homogeneous catalyst slurry even at low tank levels. Also, the inlet 34 of each second conduit 32 may be located at a point in the run tank 12 proximate an impeller 30 in order that the second conduit 32 draws catalyst slurry from the run tanks 12 that is thoroughly homogenized.

The second conduits 32 permit a continuous flow of the catalyst slurry to the pumps 18 which elevate the pressure on the catalyst slurry and push the catalyst slurry into the polymerization reactor 6 through the lead-in pipes 20. The pumps 18 may be positive displacement pumps with, by way of example, three heads or may be another type of fluid pump. In three-head pumps, each head has a plunger connected to a piston that pushes the catalyst slurry forward toward the polymerization reactor 6. When the piston retracts after pushing the plunger (and thus the catalyst slurry) toward the polymerization reactor 6, the piston retracts such that the pressure is reduced and the flow of the catalyst slurry in the head is reduced. However, with three heads working at once in the same pump 18, at least one piston is pushing the catalyst slurry toward the polymerization reactor 6 essentially all the time such that the retraction and pressure loss of the other pistons does not interrupt the nearly continuous pressure on and flow of the catalyst slurry through the pump 18. By pumping the catalyst flow continuously, the pump 18 is less likely to create and be plugged up by gas pockets in the catalyst slurry.

When the pumps 18 provide the catalyst slurry to the polymerization reactor 6 in a substantially continuous flow, the flow meters 22 may be used to measure the flow of catalyst slurry entering the lead-in pipes 20. In some embodiments, the flow meters 22 may be used to measure the less continuous flow of catalyst slurry generated by a pump having a single head (or any type of pump). Alternatively or additionally, the flow meters 22 may be used to measure the catalyst concentration within the catalyst slurry. The flow meters 22 may include coriolis type mass flow meters, though any suitable flow measuring features able to measure the flow of the catalyst slurry itself or the flow of the catalyst within the slurry as the catalyst slurry passes the flow meters 22 may be used.

A desired amount of catalyst slurry is fed to the polymerization reactor 6 to effectively aid the polymerization process. The flow meters 22 are electrically connected to a controller, for example a computer or distributed control system (DCS) 36, and to the pumps 18 such that when the flow or amount of catalyst slurry flowing through the flow meters 22 exceeds the desired amount, the controller 36 signals the pumps 18 to reduce or stop the flow or amount of catalyst slurry into the polymerization reactor 6. The controller 36 may calculate the amount of catalyst fed to the reactor over a selected time, for example, based on the measured flow and the concentration of catalyst in the catalyst slurry.

The controller 36 may signal the pumps 18 to increase or restart the flow of the catalyst slurry into the polymerization reactor 6 when the flow or amount of catalyst slurry flowing past the flow meters 22 is not enough to meet the predetermined or calculated amount of catalyst required in the polymerization reactor 6. Thus, the catalyst feeding assembly can provide a continuous flow of catalyst slurry to the polymerization reactor 6 that can be measured by the flow meters 22 and reduced, stopped, increased or started by the flow meters 22 and the pumps 18. Valves 38 on the supply lines 32 can be opened or closed (wholly or partially) to reduce, stop, increase, or start the flow of slurry into the polymerization reactor 6.

The controller 36 may measure the amount of the catalyst slurry fed into the polymerization reactor 6 over a selected period of time. The controller 36 can measure the loss in catalyst slurry level in the run tank 12, convert the level change to a mass change and then divide the mass change by the time interval to arrive at a calculated feed rate. The calculated feed rate can then be compared to a predetermined catalyst slurry rate necessary for a specified polymer production amount. The controller 36 can then alter the flow of the catalyst slurry into the polymerization reactor 6 accordingly. This calculated method is a backup to the flow meters 22 that improves the reliability of the catalyst slurry feed system. The controller 36 may measure the amount of catalyst slurry in a run tank 12 with the level indicator 28 and signal the valve 16 to open such that the run tank 12 is re-supplied with catalyst slurry from the mixing tank 4.

A reactor may have one catalyst feed or, a plurality of catalyst feeds spaced about a polymerization reactor so as to facilitate even distribution of catalyst in the fluid slurry. For example, in FIG. 1, the two lead-in pipes 20 are symmetrically arranged around the reactor to facilitate even catalyst distribution in the fluid slurry. Additionally, based on the readings of the flow meters 22, the controller 36 may calculate how often a new batch of catalyst slurry is to be made and how much slurry is to be made in the batch. In some embodiments, the lead-in pipes 20 can both feed into the same point on the polymerization reactor 6.

Unlike precontactors used in some polymerization processes to contact all or some of the polymerization components and deliver them directly into the polymerization reactor 6, the use of the mixing tank 4 with the run tank(s) 12 efficiently separates the tasks of preparing the catalyst slurry and delivering the catalyst slurry in a continuous flow. The mixing tank 4 mixes the catalyst slurry into a homogeneous state. The run tank 12 is filled with enough catalyst slurry to continuously deliver catalyst slurry for a desired length of time. Additionally, when multiple components are added, the mixing tank 4 may begin a catalyst induction process, whereupon transferal to a run tank 12 may allow completion of the induction process, followed by storage of the active catalyst slurry. Therefore, the mixing tank 4 and the run tank 12 each perform a discrete task to ensure that the polymerization reactor 6 is continuously fed with active catalyst slurry.

The catalyst slurry feeding assembly 40 provides several advantages. First, the slurry feeding assembly 40 provides a predictable, controllable and continuous flow of catalyst slurry to the polymerization reactor 6. The catalyst slurry fed to the reactor may be monitored and maintained at a specified percentage, for example, about 8 weight %. In addition, the catalyst slurry may include various components important to the operability and reliability of the polymerization reactor 6. Therefore, by continuously providing (feeding) catalyst slurry to the polymerization reactor 6 instead of introducing discrete amounts of catalyst slurry in pulses or batches or other discontinuous fashions, the flow meters 22 can better monitor and reduce or increase the flow of the catalyst slurry as desired to deliver the appropriate amount of catalyst slurry to the polymerization reactor 6. The monitoring system 36 can also allow operators to know how much catalyst slurry has been added to the reactor 6 and to calculate how much catalyst slurry is in the reactor. The catalyst slurry feeding assembly 40 can also reduce or eliminate unpredictable leakage of catalyst slurry into the lead-in pipes 20 because the catalyst slurry is stored at low pressure and is pumped into the reactor 6. Thus, the chance of too much catalyst slurry being added to the polymerization process is reduced. Additionally, the use of impellers 30 in the run tanks 12 facilitates maintaining the catalyst slurry at an essentially homogeneous solid-to-liquid weight ratio prior to being pumped into the polymerization reactor 6. Further, adding additives such as reducing agents or co-catalysts in the mix tank 4 upstream of the run tank 12 provides a more homogenous catalyst slurry than when such additives are added downstream of the mix tank 4. When the catalyst slurry is essentially homogeneous, the chance of too much or too little catalyst being added to the polymerization process is reduced. Thus, the catalyst slurry feeding assembly 40 results in a more consistent and stable reaction rate.

Figure 2:
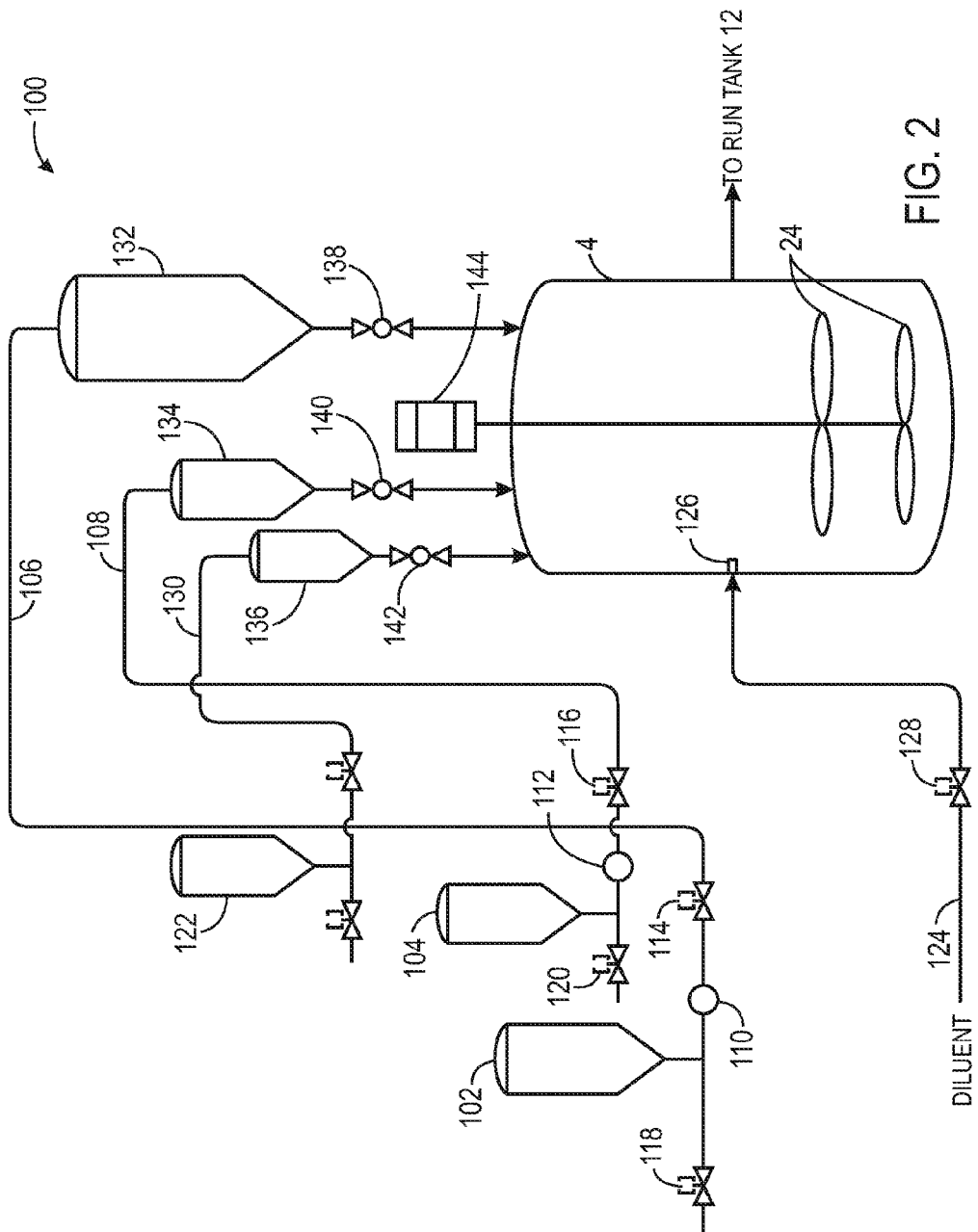
FIG. 2 is an illustration of an embodiment of a mix tank with feed lines for introduction of various polymerization components, in accordance with various aspects of the present disclosure.

In FIG. 2, an embodiment of a system 100 for the introduction of catalyst, diluents and additives into the mix tank 4 and further preparation of a catalyst slurry is illustrated. All or some of the components for polymerization may be directed to the mix tank 4, resulting in a catalyst slurry with complete or partial catalyst activation. The partially or completely activated catalyst slurry may then be directed to a run tank, such as the run tank 12 of FIG. 1 for further catalyst activation/induction, and/or storage until needed in a polymerization reactor, such as the reactor 6 of FIG. 1. A catalyst transport vessel 102 containing catalyst and an additive transport vessel 104 containing various polymerization components capable of increasing the activity of the catalyst may be fluidly connected to the mix tank 4 by a catalyst transport line 106 and additive transport line 108, respectively. The polymerization components contained within transport vessels 102 and 104 may then be transferred through the transport lines 106 and 108 to mix tank 4 using pumps 110 and 112, respectively. Valves 114 and 116 may be positioned along the catalyst transport line 106 and along the additive transport line 108, respectively, between the mix tank 4 and the transport vessels 102 and 104 such that a polymerization component contained within the transport vessels 102 and 104 may be controllably added as needed to the mix tank 4. In some embodiments, a valve 118 and 120 may be positioned along the transport lines 106 and 108, respectively, such that a polymerization component contained within the transport vessels 102 and 104 may be drained. In some embodiments, there may be one transport vessel 102 containing a mixture of various polymerization components including the catalyst. In other embodiments, two or more transport vessels 102 and 104 may carry any one or a mixture of polymerization components. For example, one transport vessel 102 may contain dry or concentrated catalyst, while another transport vessel 104 may contain an additive. Yet another transport vessel 122 may carry a diluent to the mix tank 4 via transport line 130. Alternatively or additionally, a diluent may be carried to the mix tank 4 via a transport line 124 entering into the mix tank 4 through inlet 126, wherein the flow may be controlled by a valve 128.

In some embodiments, the transport lines 106, 108, and 130 may be fluidly connected to weigh tanks 132, 134, and 136, respectively, and positioned between the mix tank 4 and their respective transport vessels. In some embodiments, there may be a single weigh tank for all components. For example, the catalyst transport line 106 may lead to the weigh tank 132 and be added to the mix tank 4 when the proper amount of catalyst is present in the weigh tank 132. Then, the additive transport line 108 may deliver an additive to the same weigh tank 132, and the process repeated as many times as necessary for different components until all components have been added. In some aspects, the process does not necessarily have to be sequential. That is, many transport lines may simultaneously deliver their respective components to the weigh tank 132. In other embodiments, combinations may be possible where certain sets of components are added to different weigh tanks. Valves 138, 140, and 142 positioned between the weigh tanks 132, 134, and 136, respectively, and the mix tank 4 may be controlled by a user or DCS, such as the DCS 36 in FIG. 1, to allow the weigh tanks 132, 134, and 136 to fill to a desired level before introduction of a polymerization component into the mix tank 4.

Upon introduction of the various polymerization components into the mix tank 4, a homogeneous slurry of polymerization components (a catalyst slurry) may be formed using features used for agitation such as a rotating element, a mixer, or a vibrating device. For example, the mix tank 4 may include the impeller 24 positioned near the bottom tangent of the mix tank 4 such that even at low levels, the catalyst slurry is agitated to ensure homogeneity. The impeller 24 is driven by a motor/drive 144 such that the motor/drive 144 may control the agitation speed (speed of the rotation of impellers 24 or other features used for agitation) and similar factors. After agitation for a given time period (e.g., 12 hours), the homogeneous catalyst slurry may then be transferred to a run tank, such as the run tank 12 of FIG. 1, for further treatment, storage, or catalyst induction.

Figure 3:
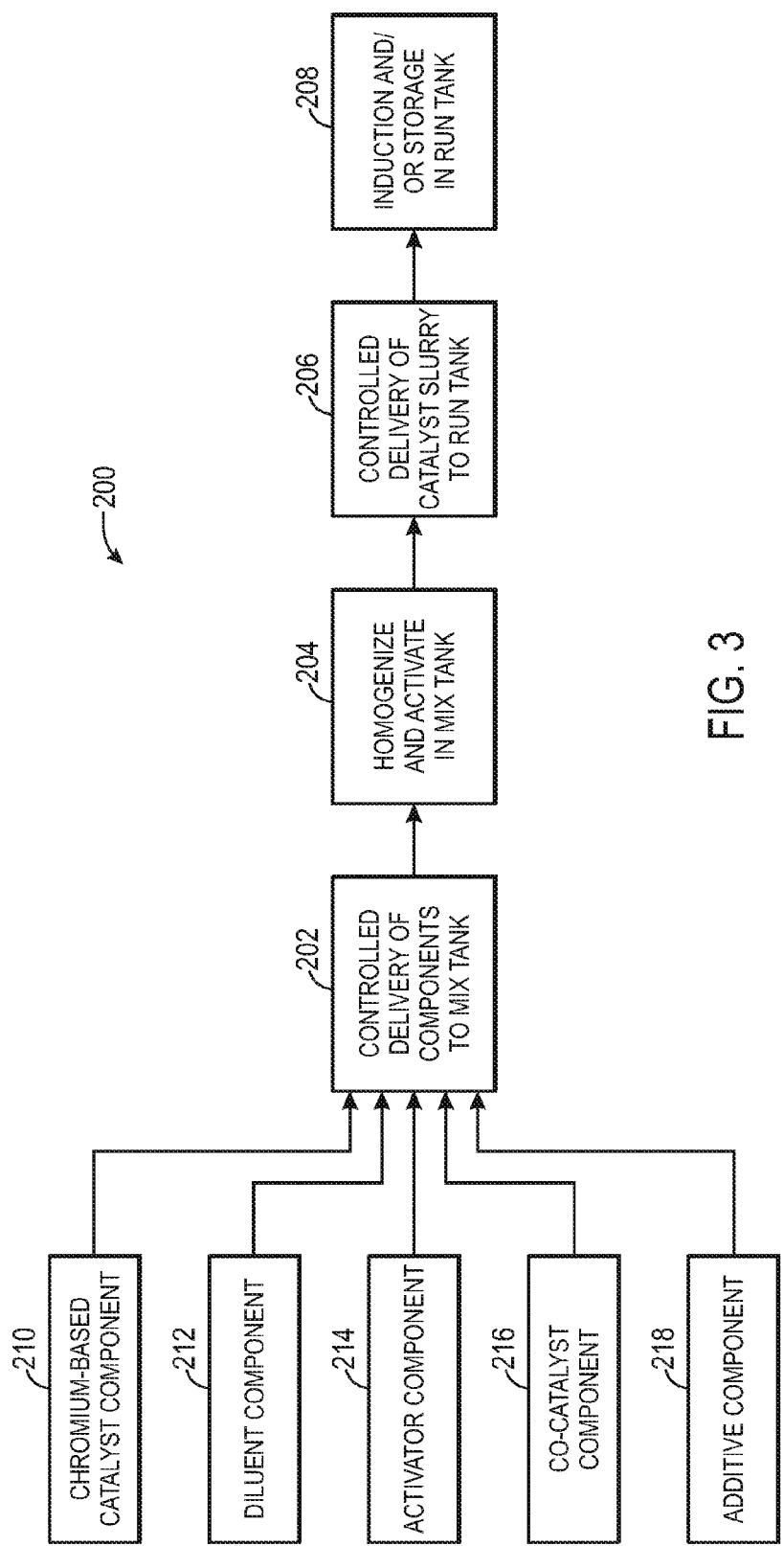
FIG. 3 is a block diagram that is representative of a method for improving catalyst activity in a mix tank, in accordance with various aspects of the present disclosure.

Turning now to FIG. 3, one embodiment of a method 200 for improving chromium-based catalyst activity using a mix tank, such as the mix tank 4 of FIG. 2, is shown. In an initial step 202, multiple polymerization components are added to the mix tank 4, upstream of run tank 12, in a simultaneous and/or sequential fashion. In the following step 204, the components are allowed to homogenize and activate the chromium-based catalyst over a given period of time. The resulting catalyst slurry containing various polymerization components is then controllably delivered in step 206 to the run tank 12 and stored until needed in a polymerization reactor 6. In some embodiments, the run tank 12 may also house the catalyst slurry while it completes an induction period and stores the active catalyst until needed in step 208.

As described with respect to FIG. 2, the mix tank 4 is designed to accommodate the introduction of various polymerization components. To improve the catalytic activity of a chromium-based catalyst, it may be desirable to treat the activated catalyst, with various polymerization components, and deliver them to the run tank 12 for induction and/or storage until needed by the polymerization reactor 6. The components that are introduced into the mix tank 4 may be selected from a chromium-based catalyst component 210, a diluent component 212, an activator component 214, a co-catalyst component 216, and an additive component 218. Combinations of some or all of the polymerization components in varying amounts may be added to the mix tank 4.

In an aspect, the features used to add components 210, 212, 214, 216, and 218 include features for addition of some or all of the components to the mix tank 4 at a controlled rate. In another aspect, the features used to add the various components to the mix tank 4 can include a single- or multi-component addition system configured to add the components to the mix tank 4 at a controlled rate, such as, for example, the system illustrated in FIG. 2.

In some aspects, the additive component 218 may be in the form of a co-catalyst component 216 or an activator component 214, or a combination of the two. In an aspect, the additive component 218 is a metal alkyl co-catalyst that is able to increase the activity of the chromium-based polymerization catalyst. In another aspect, the additive component 218 is a component that is not a metal alkyl co-catalyst, such as, for example, an activator such as a solid super acid (SSA), or a desiccant, such as molecular sieves, or a monomer or comonomer, used to reduce $Cr^{6+}$. Therefore, the term additive, as used in the present disclosure, may encompass any component added to the mix tank 4 that is capable of increasing the activity of the chromium-based polymerization catalyst, regardless of its mode of action. Co-catalyst components and activator components will therefore be treated separately to ease the discussion of method 200.

The chromium-based catalyst component 210 may be provided to the mix tank 4 in an inactive or active form. The chromium-based catalyst component 210 may also be provided to the reactor at levels that may lead to a balance between good catalyst activity and desired properties of the polyolefin product. For example, the catalyst may be provided to the reactor in amounts ranging from about 7 to about 12 weight percent of the slurry. In some embodiments, the catalyst component 210 may be provided to the mix tank 4 as a mixture of both active and inactive catalyst. In some aspects, the chromium-based catalyst may be chromium oxide on an inorganic solid support. For example, the chromium-based catalyst component 210 may be chromium oxide on silica, alumina, silica-titania, aluminophosphates, clays, or mixtures thereof. In some aspects, the catalyst may be chromium oxide on silica, with $Cr^{6+}$ being present in about 0.2 to 1.0 weight percent. The particle size of the chromium oxide on solid support may vary, and may be chosen depending on the size of the reactor, the desired flow rate of the slurry through the reactor, the desired properties of the polyolefin, and similar factors. For example, the solid support may have particle sizes between 10 and 500 microns. In certain of these, the solid support may be in the range of 25 to 250 microns or 40 to 130 microns. The catalyst on solid support's rate of polymerization is also determined by both the surface area and the pore volume of the particles, which directly relates to the amount of reactions the catalyst particle may perform simultaneously. Thus, the surface area of the solid support may be in the range of 100 to 1000 $m^2/g$. For example, the solid support may have surface areas in the range of 200 to 600 $m^2/g$ or 250 to 550 $m^2/g$. Pore volumes of the solid support may vary between 0.5 to 5 mL/g For example, the solid support may have pore volumes in the range of 0.8 to 3 mL/g or 1.0 to 2.5 mL/g.

Many factors may affect the degree to which a chromium-based catalyst is activated when contacted with various polymerization components. In some aspects, these factors include temperature, pressure, contact time, concentrations, and combinations thereof. One factor with respect to introduction of various polymerization components is the overall concentration (or weight percentage) of each component in a mix tank 4, which may directly affect the collision rates of the components with one another. The concentrations of each component can therefore affect product quality and reactor operation. Accordingly, a diluent component 212 may be added in varying amounts to control component efficiency, overall catalyst performance, and product quality and reactor operability. In an aspect, a diluent component 212 may contain any number of hydrocarbyl diluents including isobutane, propane, n-pentane, i-pentane, neopentane and n-hexane. In some embodiments, the diluent component 212 may include a reducing agent, as it may be desirable to use a reducing agent for the reduction of $Cr^{6+}$ to $Cr^{2+}$, which may increase catalyst activity. Reducing agents may be isobutane, substituted and unsubstituted alkanes, toluene, olefins and alkynes. In a further aspect, the reducing agent may be an alpha-olefin (e.g., 1-hexene). The reducing agent may also serve to affect the properties of the resulting polyolefin. The amounts of reducing agent present within the diluent component 212 may vary between 0.01 to 99.9 mol % and may be chosen based upon the desired activity of the catalyst and properties of the polyolefin product. For example, the reducing agent may be present in amounts between 0.1 to 50 mol %, or 1 to 10 mol %.

In the case of a chromium (Cr) oxide catalyst, a co-catalyst may convert $Cr^{6+}$ to $Cr^{2+}$, for example, to improve the quality of the catalyst and to increase the activity of the catalyst. The activator compound component 214 may be any activator compound suitable for activation, conversion, or reduction of the chromium-based catalyst component 210 to the active state for polymerization. For example, the activator compound component 214 may be a treated solid oxide. More specifically, in some cases, the activator compound component 214 is a solid super acid (SSA). Other suitable activator components will be obvious to those skilled in the art and are within the scope of the present disclosure.

During the course of polymerization and in some instances, beforehand, a polymerization component may be added to the catalyst slurry, forming catalyst poisons after interaction with a catalyst component. For example, 1-hexene is often added to polyethylene polymerizations to decrease density by incorporating pendant alkyl chains into the backbone of the polymer. In one embodiment, it is believed that chromium-based catalysts interact with 1-hexene and as a result of this interaction, in addition to incorporation into a polymer chain, catalyst poisons may be formed, including, for example, formaldehyde and pentaldehyde. Other instances where a catalyst poison may be formed include when the chromium-based catalyst is treated with a reducing agent to increase catalyst activity. However, to take full advantage of the increased catalyst activity, the effect of the formed catalyst poisons may be mitigated. Therefore, in some instances, it may be desirable to use an activator compound component 214 wherein the component is any high surface area, porous material capable of strongly adsorbing Lewis bases such as aldehydes, alcohols and ethers.

In some embodiments, the activator compound component 214 may be a solid oxide. In various aspects, the solid oxide may be a chemically-treated solid oxide that has been treated with an electron-withdrawing component. Further, in some embodiments, the activator compound component 214 is a high surface area oxidic carrier containing strong Lewis acidity, such as, for example, halided or sulfated alumina, silica, titania, zirconia, boria, aluminophosphates, or combinations thereof, zeolites, clays and other strong adsorbents. In other aspects, the activator compound component 214 may be a solid oxide that has been optionally treated with a metal, including zeolites, silica-alumina, silica-titania, silica-zirconia and other so-called mixed oxides, or any combination thereof. In another aspect, the activator compound component 214 may be treated with a combination of electron withdrawing substituents and metals, such as sulfated alumina, fluorided silica-alumina, fluorided alumina, fluorided silica-zirconia, or any combination thereof. While the activator compound component 214 may be effective when containing such compounds, it should be noted that a large variety of chemically-treated solid oxides may be suitable for use according to the present technique. Indeed, the electron withdrawing substituents used to treat the solid oxides may be selected from any anion that is capable of increasing the acidity of the solid oxide. For instance, electron withdrawing substituents may be selected from fluoride, chloride, bromide, phosphate, triflate, bisulfate, sulfate, fluorophosphate, or any combination thereof. Further, the aforementioned mixed solid oxides may comprise metals selected from zinc, tin, magnesium, tungsten, molybdenum, zirconium, gallium, copper, silver, vanadium, palladium, platinum, or any combination thereof. Additionally or alternatively, methods concerning the formation or use of such solid oxides may include features to substantially reduce the presence of the listed anions and/or metals as may be desirable for certain applications. Indeed, it may be desirable for the activator compound component 214 to include any combination of these compounds and materials.

The level of additives, catalyst poisons, and the like may dictate how long and under what particular conditions the activator component 214 must be contacted with the chromium-based catalyst component 210. In some aspects, the SSA or another activator component may be contacted with the chromium-based catalyst component 210 for between 10 minutes and 30 days. For example, in an aspect, the contact time may be between 1 hour and 10 days. In another aspect, the contact time may be between 12 hours and 5 days. Other conditions which may be varied include the contact temperature and relative concentrations of the activator component 214 and the chromium-based catalyst component 210. The contact temperature may be between 0 and 120° C. By way of example, the contact temperature may be between 20 and 50° C., or between 20 and 40° C. The ratio of SSA to chromium-based catalyst may also vary based on the desired activity of the catalyst, the relative levels of catalyst poisons in a given polymerization reaction, and the desired properties of the polyolefin product. By way of example, the ratio may be 0.01 to 10 SSA to catalyst, or 0.01 to 1 SSA to catalyst, or in a further aspect, 0.1 to 0.5 SSA to catalyst.

Prior to addition to the mix tank 4, the activator compound component 214 may be pretreated by heating under particular atmospheric conditions. For example, a SSA may be calcined at temperatures ranging from 100 to 800° C. In some aspects, the calcination may be performed between 200 and 700° C., and in another aspect, the calcination may be done at temperatures between 250 and 600° C. Various atmospheres may lend themselves to better pretreatment results, such that catalyst poisons are substantially reduced or present in amounts that are within a desired range. Accordingly, the SSA may be pretreated in atmospheres chosen from air, nitrogen, argon, vacuum, oxygen, hydrocarbon vapor, or combinations thereof. Indeed, in an aspect, it may be desirable to pretreat under nitrogen.

Table 1 provides an example of the effect of activator compound components 214 on the activity of a chromium oxide catalyst on silica (969 MPI). However, this example is provided for purposes of illustration and is not intended to be construed as limiting the scope of the techniques. As shown in Table 1, the activator compound components 214 used in these examples may include fluorinated solid super acids (F-SSA), sulfated solid super acids (S-SSA), and molecular sieves (4 Å Mole Sieve). The 1-hexene used may serve to reduce the chromium catalyst from $Cr^{6+}$ to $Cr^{2+}$, in addition to lowering the density of the polyolefin product. In these embodiments, a bench reactor was run at a temperature of 105° C. over a 1-2 hr period, using 550 pounds per square inch gauge (PSIG) ethylene monomer. In Example 1, no catalyst activity is observed for a relatively modest charge of 0.0785 g of catalyst in the presence of 1-hexene, creating a need to increase the charge of catalyst, as shown in Example 2. Presumably, such an effect may be attributed to the formation of catalyst poisons due to the interaction between the chromium-based catalyst and the ethylene. Accordingly, upon addition of various activator components 214, high catalyst activity is observed at low catalyst charge levels. The catalyst activity is shown uncorrected and corrected for catalyst induction time (normalized over 1 hr), labeled as Uncorrected Catalyst Activity and Corrected Catalyst Activity, respectively. Indeed, the addition of SSA or mole sieve to a chromium-based catalyst mixture may lower catalyst induction times.

TABLE 1

Effect of Activator on 969MPI $CrO_x$ catalyst

| Ex. No | Catalyst Charge (g) | Activator Component | Activator Charge (g) | Reaction Time (min) | Uncorrected Catalyst Activity (g product/g catalyst) | Corrected Catalyst Activity (g product/g catalyst) |
| --- | --- | --- | --- | --- | --- | --- |
| 1 | 0.0785 | none | 0 | 98 | 0 | 0 |
| 2 | 0.1230 | none | 0 | 79 | 1463 | 2409 |
| 3 | 0.0765 | S-SSA | 0.51 | 66 | 2567 | 3322 |
| 4 | 0.0452 | S-SSA | 0.32 | 92 | 2482 | 3044 |
| 5 | 0.0806 | F-SSA | 1.41 | 75 | 2600 | 3001 |
| 6 | 0.0574 | 4 Å Mole Sieve | 2.86 | 81 | 3200 | 3928 |

The method of FIG. 3 also provides for the addition of a co-catalyst component 216. In some embodiments, a co-catalyst may convert $Cr^{6+}$ to $Cr^{2+}$, for example, to improve the quality of the catalyst and to increase the activity of the catalyst. In some embodiments, the co-catalyst component 216 may also lower or eliminate induction times and modify the molecular weight (and thus the properties) of the polyolefin product. Some co-catalysts may also scavenge various catalyst poisons, such as, for example, water, oxygen, carbon monoxide, carbon dioxide, sulfur-containing compounds, oxygen-containing compounds and halogen-containing compounds. Thus, the co-catalyst component 216 is added to the mix tank 4 as an alkylator, electron acceptor, scavenger, or for reduction of the chromium-based catalyst component 210 or specifically as the active metal species of the chromium-based catalyst component 210. In an aspect, the co-catalyst component 216 is added separately from the chromium-based catalyst component 210 to the mix tank 4 to treat the chromium-based catalyst component 210. The co-catalyst component 216 may be any compound suitable as an alkylator, electron acceptor, or reducing agent, such as, for example, metal alkyls. The metal alkyls may be alkyl-containing derivatives of aluminum, boron, magnesium, zinc, and lithium. The alkyl portion of the metal alkyl may be any aryl, linear or branched alkyl group. The metal alkyl may also further contain alkoxides, aryloxides, and halides.

In some embodiments, the co-catalyst may be aluminum-containing metal alkyls of the formula:

$$Al(X^1)_n(X^2)_{3-n},$$

wherein $(X^1)$ is a hydrocarbyl having from 1 to about 20 carbon atoms; $(X^2)$ is selected from alkoxide or aryloxide having from 1 to about 20 carbon atoms, halide, or hydride; and n is a number from 1 to 3, inclusive. In one aspect, $(X^1)$ is an alkyl having from 1 to about 10 carbon atoms. Examples of $(X^1)$ moieties include, but are not limited to, ethyl, propyl, n-butyl, sec-butyl, isobutyl, hexyl, and the like. In another aspect, $(X^2)$ may be independently selected from fluoro or chloro. In yet another aspect, $(X^2)$ may be chloro. In some aspects, the organoaluminum compound may be trimethylaluminum (TMA), triethylaluminum (TEA), tripropylaluminum, diethylaluminum ethoxide, tributylaluminum, diisobutylaluminum hydride, triisobutylaluminum, diethylaluminum chloride, or any combination thereof.

In another aspect, the co-catalyst component 216 may contain an organozinc cocatalyst. In one aspect, the co-catalyst component 216 contains an optional organozinc cocatalyst, selected from a compound with the following formula:

$$Zn(X^3)(X^4),$$

wherein $(X^3)$ is a hydrocarbyl having from 1 to about 20 carbon atoms; $(X^4)$ is selected from a hydrocarbyl, an alkoxide or an aryloxide having from 1 to about 20 carbon atoms, halide, or hydride. In another aspect, the organozinc co-catalyst is selected from dimethylzinc, diethylzinc, dipropylzinc, dibutylzinc, dineopentylzinc, di(trimethylsilylmethyl)zinc, and the like, including any combinations thereof.

In one aspect, the co-catalyst component 216 may contain an organoboron compound. For example, the organoboron compounds of the present embodiments may be a halided organo boron compound. Any haloorgano boron compound known in the art can be utilized. The term haloorgano boron compounds has its usual meaning to refer to neutral compounds of the form:

$$B(X^5)_n(X^6)_{3-n},$$

wherein $X^5$ may be selected from any hydrocarbyl having from 1 to about 20 carbon atoms, and $X^6$ is selected from a hydrocarbyl, an alkoxide or an aryloxide having from 1 to about 20 carbon atoms, halide, or hydride; and n is a number between 1 and 3, inclusive. In some aspects, the organoboron co-catalyst may contain hydrocarbyls. In another aspect, the organoboron co-catalyst may be selected from triethylboron, trimethylboron, triisopropylboron, tributylboron, and similar compounds, or any combination thereof.

In yet another aspect, the co-catalyst component 216 may be an alkyl-containing derivative of magnesium (an organomagnesium, also referred to as a Grignard reagent). The organomangesium compound may further contain a halogen. Thus, the organomagnesium co-catalyst may be selected from compounds of the form $$(X^7)(Mg)(X^8),$$

wherein $X^7$ may be selected from any group of anionic hydrocarbyl derivatives containing 1 to 20 carbons and $X^8$ may be a halide, such as chloride or bromide. The hydrocarbyl may be a straight chain or branched alkyl. In some aspects, the organomagnesium may be selected from methylmagnesium bromide, ethylmagnesium bromide, propylmagnesium bromide, butylmagnesium bromide, phenylmagnesium bromide, and similar compounds, or any combination thereof.

In a further aspect, the co-catalyst component 216 may be an organolithium co-catalyst. The organolithium may contain any anionic hydrocarbyl containing between 1 and 20 carbons. Thus, the organolithium co-catalyst may be selected from compounds of the form $$(X^9)Li,$$

wherein $X^9$ may be any anionic hydrocarbyl containing between 1 and 20 carbons, such as, for example, methyl, butyl, phenyl, and the like. The hydrocarbyl anions may be straight-chain or branched. In some aspects, the organolithium co-catalyst component may be methyllithium, butyllithium, phenyllithium, and similar compounds, or any combination thereof.

By way of example, the metal alkyl may be trimethylaluminum, triethylboron, diethylzinc, methylmagnesium bromide, butyllithium, or combinations thereof. Indeed, it may therefore be desirable, in some aspects, for the co-catalyst component 216 to be a combination of one or more metal alkyls in varying concentrations.

Varying the amounts of co-catalysts that are added to the polymerization reactor 6 may have differing affects on the polymerization outcome. For example, lower co-catalyst to chromium-based catalyst ratios may increase chromium-based catalyst activity without significantly affecting the properties of the polyolefin product. By way of example, in aspects such as these, it may be desirable to have co-catalyst to catalyst ratios in the range of 0.1 to 10 co-catalyst to catalyst, or 0.2 to 5.0 co-catalyst to catalyst, or, in a further aspect, 0.5 to 3 co-catalyst to catalyst. At higher levels of co-catalyst, the properties of the obtained polyolefin may be affected. For example, at higher levels of metal alkyl co-catalyst, broader molecular weight distributions may be obtained.

Additionally, varying the types of co-catalysts that are added to a polymerization reactor may have differing effects on the polymerization outcome. For example, adding organoaluminum-type co-catalysts may aid the activity of the chromium-based catalyst by scavenging water, which is a catalyst poison. In some aspects, organoaluminum-type co-catalysts may also significantly lower or substantially eliminate induction times of the chromium-based catalyst. Similarly, organoboron-type cocatalysts may serve to scavenge both water and oxygen, and may lead to a broader molecular weight distribution of the polyolefin product.

Co-catalyst contact time with the catalyst prior to polymerization may also have a marked effect on both catalyst activity and the properties of the polyolefin product. In some aspects, the metal alkyl may be contacted with the chromium-based catalyst component 210 for between 10 minutes and 30 days.

For example, in an aspect, the contact time may be between 1 hour and 10 days or between 12 hours and 5 days.

According to a method 200 in FIG. 3, some or all of the components for polymerization, excluding the major monomer (e.g., ethylene), may be controllably fed into the mix tank 4 in a step 202 and, according to a step 204, allowed to homogenize and/or react with one another for a given time under a given set of conditions as set forth above. The given sets of conditions that may be controlled include relative concentrations, temperature, pressure, atmosphere, agitation rate, and the like. In some aspects, in a step 206, it may be desirable to direct the resultant catalyst slurry to the run tank 12 (a storage tank), where the catalyst slurry may be stored or undergo an induction period in a step 208. During the catalyst induction period, in one embodiment, the chromium-based polymerization catalyst may undergo an oxidation state change to a more active species for polymerization. For example, the $Cr^{6+}$ catalyst may be reduced to a $Cr^{2+}$ oxidation state during an induction period. By way of example, the induction period may last between about 2 hours to about 12 hours. In another aspect, the induction period may fully occur within the mix tank 4 before the catalyst slurry is directed to the run tank 12. In some embodiments, the induction period may occur partially within the mix tank 4 and be completed in the run tank 12. After a catalyst induction period is completed, the catalyst slurry may be directed stored in the run tank 12 for a given amount of time, or until called upon when needed in the polymerization reactor 6.

Figure 4:
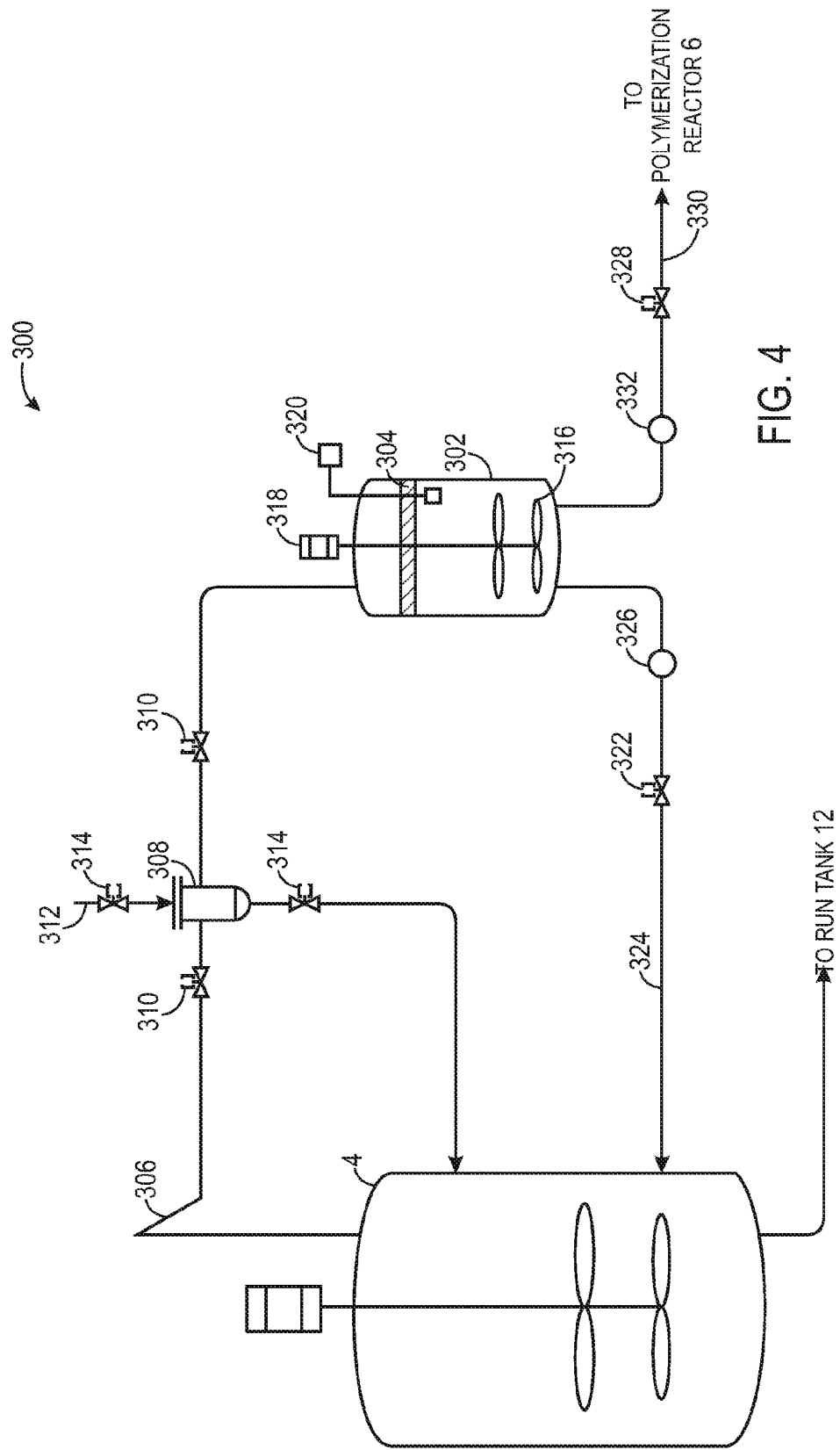
FIG. 4 is an illustration of an embodiment of a mix tank system with a separate vessel for treating a catalyst slurry liquid medium, in accordance with one aspect of the present disclosure.
Figure 5:
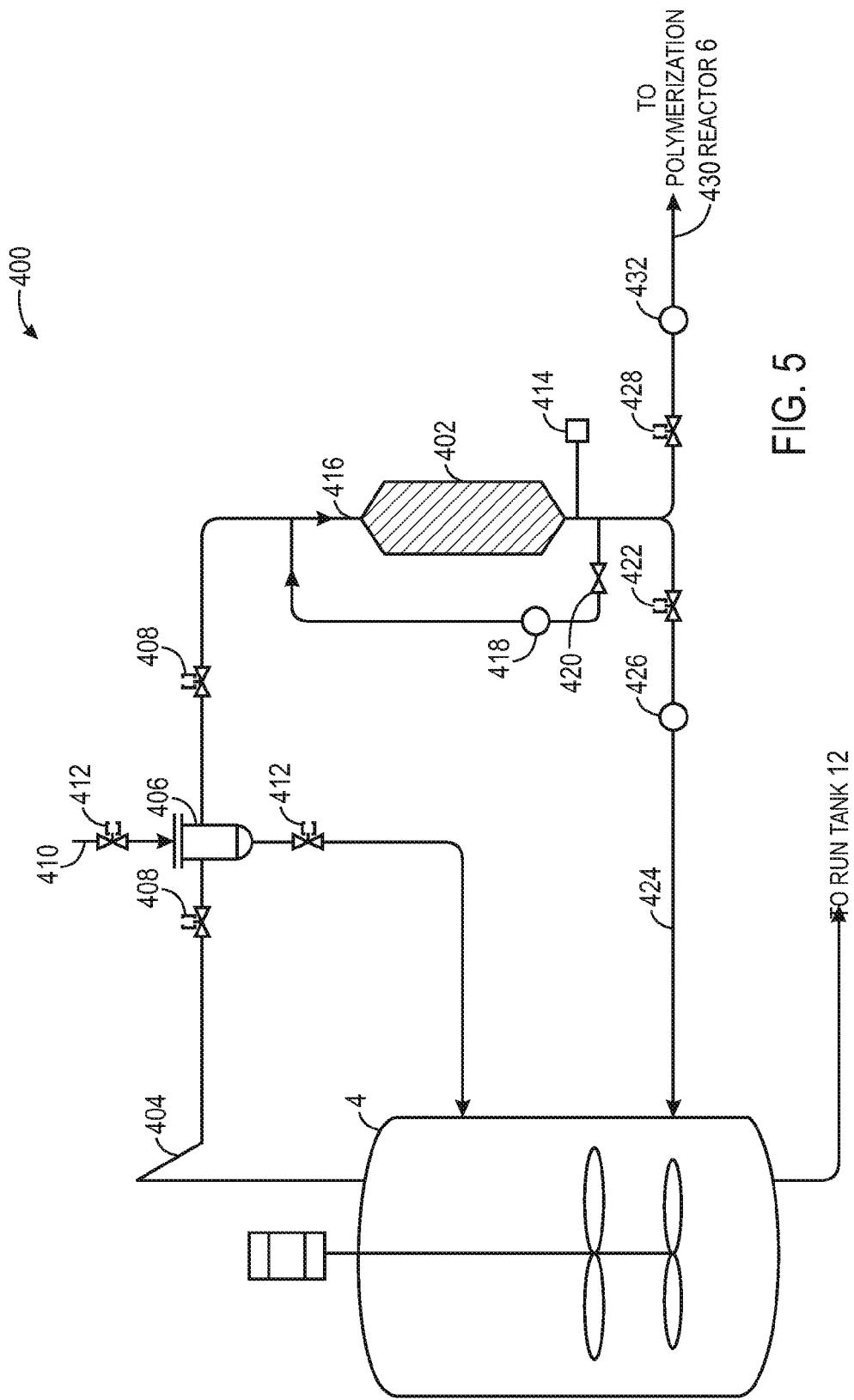
FIG. 5 is an illustration of an embodiment of a mix tank system with a separate column for treating a catalyst slurry liquid medium, in accordance with one aspect of the present disclosure.

As discussed previously with respect to catalyst poisons as a result of catalyst activation, diluent and reducing agent treatment, it may be desirable to significantly reduce the presence of catalyst poisons within the mix tank 4. Thus, the primary catalyst slurry that contains catalyst poisons as a result of initial activation (or initial contact between the polymerization components) may be treated to remove the catalyst poisons and form another, more active catalyst slurry that is substantially free of catalyst poisons. With these aspects in mind, turning now to FIGS. 4 and 5, further embodiments to improve catalyst activity by removal of catalyst poisons are shown. In FIGS. 4 and 5, mix tank-liquid medium purification systems are shown. In FIG. 4, a mix tank-liquid medium system 300 is shown, wherein a treater tank 302 contains a treater bed 304. The treater bed 304 may be a bed of any high surface area, porous material capable of strongly adsorbing Lewis bases such as aldehydes, alcohols and ethers, from a hydrocarbol solvent. In some aspects, the material of the treater bed 304 may be selected from the solid super acids (SSAs) as described above. For example, the material of the treater bed 304 may be halided or sulfated alumina, silica, titania, zirconia, boria, aluminophosphates, or combinations thereof. In other aspects, the material of the treater bed 304 may be zeolites, silica-alumina, silica-titania, silica-zirconia, aluminophosphates, charcoal, clay, or any combination thereof. In yet another aspect, the material of the treater bed 304 may be sulfated alumina, fluorided silica-alumina, fluorided alumina, fluorided silica-zirconia, or any combination thereof. Indeed, it may be desirable for the material of the treater bed 304 to include any combination of these compounds and materials.

As shown in an aspect in FIG. 4, the mix tank 4 may be fluidly connected to the treater tank 302 by way of a transport line 306. In some aspects, it may be desirable to remove the catalyst particles from the primary catalyst slurry with catalyst poisons so that substantially only the liquid medium of the primary catalyst slurry with catalyst poisons passes through the treater bed 304 of the treater tank 302. Therefore, a catalyst filter 308 may be placed along the transport line 306 to capture any solid particles of the catalyst slurry (e.g., the catalyst on solid support). In some embodiments, it may be desirable to treat the liquid medium for an extended amount of time, thus, the transport line 306 may also have features to stop, start, and/or adjust the flow of catalyst slurry though the transport line 306. Accordingly, the features may include valves 310 placed on either side of the catalyst filter 308 such that the flow may be regulated going into and coming out of the catalyst filter 308. In a further embodiment, the catalyst particles trapped within the catalyst filter 308 may be removed using a diluent flush line 312. The diluent may be selected from hydrocarbyl diluents including isobutane, propane, n-pentane, i-pentane, neopentane, n-hexane and similar compounds. The flush line 312 may also have features to regulate the flow entering and exiting the catalyst filter 308 so that the resultant catalyst slurry is flushed back into the mix tank 4. Such features may include valves 314 positioned on either side of the catalyst filter 308.

The substantially solid-free liquid medium of a catalyst slurry may be passed through the treater bed 304 within the treater tank 302 in such a way as to maximize the liquid medium's flow though the catalyst treater bed 304 using, for example, features used for agitation such as any rotating device, a mixer, or a vibrating device, or any combination thereof. The features used for agitation may include impellers 316 that continuously stir the liquid medium, which are driven by a motor/drive 318 that is able to continuously and adjustably control the rate of agitation of the liquid medium. The liquid medium may be passed continuously through the treater bed 304 for a given amount of time, such as, for example, any time between 10 minutes and 30 days (e.g., between 1 hour and 10 days or 12 hours and 5 days).

The treater tank 302 may also have features for monitoring a level of catalyst poison within a liquid medium. The features may include a meter 320 that is able to accurately measure levels of aldehydes, ethers, and/or alcohols using features commonly known to those skilled in the art. An operator or digital controller may monitor catalyst poison levels such that when a treated liquid medium (e.g., a liquid medium that has passed through the treater tank 302) is deemed to be substantially free of catalyst poisons, or, when the level of catalyst poisons is within an acceptable range, the operator or controller may then direct the treated liquid medium back to the mix tank 4. The features used to controllably direct a treated liquid medium from the treater tank 302 back to the mix tank 4 may include valves 322 positioned along the transport line 324 leading back to the mix tank 4. The treater tank 302 may be positioned at a higher elevation than the mix tank 4 such that a treated liquid medium is carried through the transport line 324 at least partially by gravity. Alternatively or additionally, a pump 326 may be placed such that a treated liquid medium may be pneumatically driven back to the mix tank 4.

In some aspects, it may be desirable to direct the treated liquid medium of the catalyst slurry to the polymerization reactor 6 such that the liquid medium enters the polymerization reactor 6 at different points to ensure homogeneity of the components within the polymerization reaction. Thus, the treated liquid medium of the catalyst slurry may be used for flush points to the polymerization reactor 6 and replaced in the mix tank 4 with fresh liquid medium to maintain a desired slurry concentration. The features used to controllably direct a liquid medium from the treater tank 302 to the polymerization reactor 6 may include valves 328 positioned within a transport line 330 leading to the polymerization reactor 6. The treater tank 302 may be positioned at a higher elevation than the polymerization reactor 6 such that a liquid medium is carried through the transport line 330 at least partially by gravity. Alternatively or additionally, pumps 332 may be placed such that a treated liquid medium may be pneumatically driven to the polymerization reactor 6.

In FIG. 5, another embodiment of a mix tank-treater vessel is shown. The mix tank-treater system 400 may comprise the mix tank 4 that is fluidly connected to a fixed column 402 by a transport line 404. The fixed column 402 may be packed with similar components (solid super acids, Lewis acids) as described with respect to the treater bed 304 of FIG. 4. In the mix tank-treater system 400, a liquid medium (e.g., diluents, reducing agents) of a catalyst slurry may be separated from solid particles (e.g., a chromium-based catalyst on solid support) to facilitate elution through the packed column 402. The separation of solid particles from the liquid medium of the primary catalyst slurry with catalyst poisons may be facilitated by a catalyst filter 406 that is positioned along the transport line 404 between the mix tank 4 and the fixed column 402. In some aspects, the flow rate of the liquid medium may be controlled using valves 408 positioned at either side of the catalyst filter 406 such that the flow may be increased, decreased, stopped, or fully opened. In a further embodiment, the catalyst particles trapped within the catalyst filter 406 may be removed using the diluent flush line 410. The diluent may be selected from inert hydrocarbyl diluents including isobutane, propane, n-pentane, i-pentane, neopentane, n-hexane and similar compounds. The flush line 410 may also have features to regulate the flow entering and exiting the catalyst filter 406, wherein the resultant catalyst slurry is flushed back into the mix tank 4. Such features may include valves 412 positioned on either side of the catalyst filter 406.

The mix tank-treater system 400 may also have features for monitoring a level of catalyst poison within a liquid medium. Such features may include a meter 414 that is able to accurately measure levels of aldehydes, ethers, and/or alcohols using methods commonly known to those skilled in the art. A controller may monitor catalyst poison levels such that when the treated liquid medium is deemed to be substantially free of catalyst poisons, or, when the level of catalyst poisons is within an acceptable range, the operator or controller may then direct the treated liquid medium back to the mix tank 4 or the polymerization reactor 6.

In some embodiments, the liquid medium of the catalyst slurry may be recirculated through the fixed column 402 using a transport line 416 and features for directing flow back to the top of the fixed column 402 if the treated liquid medium is found to contain unacceptable levels of catalyst poisons. Such features may include a pump 418 along the transport line 416 that may be adjusted by a controller, such as the controller 36 of FIG. 1. The controller 36 may also control valves 420 that direct the flow of a treated liquid medium through the transport line 416.

Controllably directing the treated liquid medium from the fixed column 402 back to the mix tank 4 may be at least partially performed by a valve 422 positioned within the transport line 424 leading back to the mix tank 4. The fixed column 402 may be positioned at a higher elevation than the mix tank 4 such that a liquid medium is carried through the transport line 424 at least partially by gravity. Alternatively or additionally, pumps 426 may be placed such that the treated liquid medium may be pneumatically driven back to the mix tank 4.

In some aspects, the treated liquid of the catalyst slurry is used for flush points to a polymerization reactor 6 and replaced in the mix tank 4 with fresh liquid medium to maintain a desired slurry concentration. The features used to controllably direct a liquid medium from fixed column 402 to the polymerization reactor 6 may include valves 428 positioned along the transport line 430 leading to the polymerization reactor 6. The fixed column 402 may be positioned at a higher elevation than the polymerization reactor 6 such that a liquid medium is carried through the transport line 430 at least partially by gravity. Alternatively or additionally, pumps 432 may be placed such that a treated liquid medium may be pneumatically driven to the polymerization reactor 6.

Figure 6:
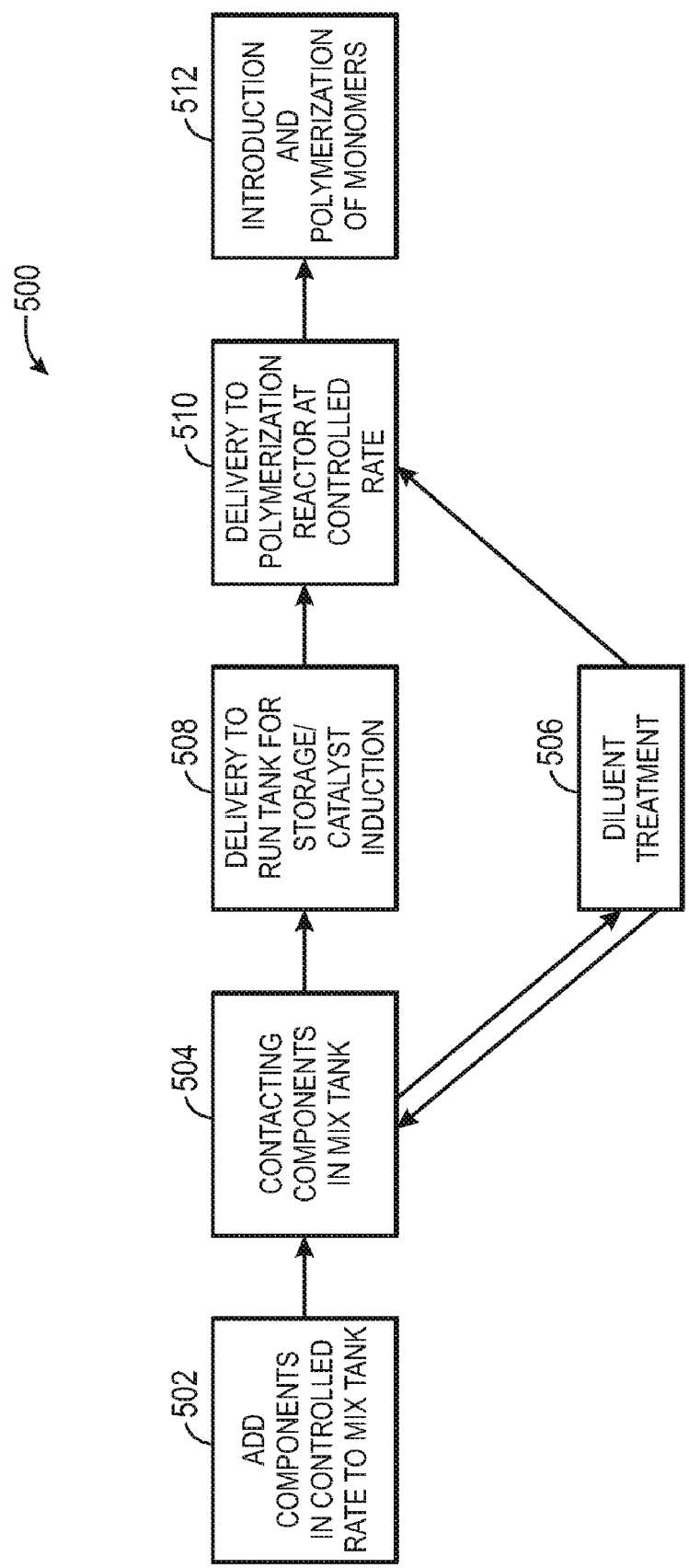
FIG. 6 is a block diagram that is representative of a method for improving catalyst activity in a polymerization process, in accordance with various aspects of the present disclosure.

Turning now to FIG. 6, and in reference to the illustrated method 500 for the polymerization of olefin monomers, step 502 may include the introduction of various polymerization components excluding the major monomer (e.g., ethylene) into the mix tank 4. The polymerization components used may be any one or combination of the chromium-based catalyst component 210, the diluent component 212, the activator component 214, the co-catalyst component 216, and the additive component 218. The various polymerization components may be added in a controlled fashion by controlling the flow rate of a feed stock, weighing the components in weigh tanks 132 and/or 134 and/or 136 or any combination of features such that the amount of a component added to the mix tank 4 is known and within a desired range.

The method 500 of polymerization may further proceeds via step 504, contacting all or portions of the polymerization components 210, 212, 214, 216, and 218 for a certain amount of time under any number of desired conditions. Contacting all or portions of the polymerization components may result in the formation of a catalyst slurry of desirable activity. Additionally, in some aspects, the catalyst induction period may be fully completed within the mix tank 4. In other aspects, the catalyst induction period may occur in another vessel, such as the run tank 12, or the reactor 6. In further aspects, the induction period may occur in a combination of vessels including the mix tank 4, the run tank 12 and the polymerization reactor 6, or any combination thereof.

Treatment of a catalyst to form a more active catalyst may also result in the formation of catalyst poisons, as discussed with respect to liquid medium treatment and treatment of the catalyst slurry with activators and reducing agents. Therefore, method 500 may include an optional step 506 of treating a liquid medium of the primary catalyst slurry with catalyst poisons with the treater bed 304 or fixed column 402 containing any high surface area, porous material capable of strongly adsorbing Lewis bases. The treated liquid medium may be returned back to the mix tank 4 in order that a desired slurry concentration is maintained. Alternatively or additionally, a portion or all of a treated liquid medium may be sent directly to a polymerization reactor 6 as a flush point or multiple flush points, and the mix tank 4 charged with fresh liquid medium to maintain a desired slurry concentration.

From the mix tank 4, step 508 involves directing polymerization components 210, 212, 214, 216, and 218 to the run tank 12 (storage tank). In the run tank 12, the catalyst induction period may be completed over a given duration, such that the catalyst slurry is allowed to convert from an initial state to a more active state. For example, the catalyst induction period may complete the reduction of $Cr^{6+}$ to $Cr^{2+}$, which may occur over a given amount of time (e.g., between 10 minutes and 30 days, or 1 hour and 10 days, or 12 hours and 5 days). In another aspect, the catalyst induction period of a catalyst slurry may be complete upon introduction into the run tank 12. Nevertheless, after a given catalyst induction period, the activated catalyst slurry within the run tank 12 may serve as a catalyst slurry feed stock for the polymerization reactor 6. When fresh, active catalyst is needed in the polymerization reactor 6, according to step 510, the active catalyst slurry may be directed from the run tank 12 to the polymerization reactor 6.

In a final step 512, a separate feedline or other similar feature or features used for transport may be directed into the polymerization reactor 6 containing a feed of a major monomer or monomers (e.g., ethylene, or ethylene and propylene, or ethylene and butadiene). Upon introduction of a monomer or monomers into the polymerization reactor 6, step 524 provides that the active catalyst slurry may be directed into the polymerization reactor in accordance with the selected conditions of polymerization to produce a polyolefin with desired properties.

Systems and methods for the maintenance of active chromium-based catalysts and their use in polymerization processes are described. In one embodiment, a system for the introduction of multiple polymerization components to activate a chromium based catalyst within a mix tank is described. Other described features may include materials and methods to purify the liquid medium of a catalyst slurry so that the catalyst slurry maintains a high level of activity. The active chromium-based catalyst may provide polyolefins with a number of desirable properties in a reliable, consistent, and predictable manner.

ADDITIONAL DESCRIPTION

Systems and methods for the maintenance of active chromium-based catalysts and their use in polymerization processes have been described. The following clauses are offered as further description.

Embodiment 1

A method of preparing a catalyst slurry as a supply for a polymerization reactor comprising the acts of: contacting, at least one chromium-based olefin polymerization catalyst and at least one additive capable of increasing an activity of the chromium-based olefin polymerization catalyst within a liquid medium to form a catalyst slurry; wherein the contacting occurs under non-polymerization conditions in a mix tank upstream of said run tank; and directing the catalyst slurry to a run tank for storage, or induction, or eventual supply to a polymerization reactor, or any combination thereof.

Embodiment 2

The method of embodiment 1, wherein the at least one chromium-based olefin polymerization catalyst is chromium oxide on a solid support; wherein the solid support comprises silica, alumina, silica-titania, aluminophosphates, clays, or mixtures thereof.

Embodiment 3

The method defined in embodiment 1 or embodiment 2, wherein the at least one additive comprises one or more metal alkyl cocatalysts selected from alkyl-containing derivatives of at least one of aluminum, boron, magnesium, zinc, and lithium, or any combination thereof.

Embodiment 4

The method defined in any preceding embodiment, wherein the at least one additive comprises a Lewis acid and the liquid medium comprises a reducing agent.

Embodiment 5

The method defined in embodiment 4, wherein the Lewis acid comprises a SSA comprising at least one of: halided or sulfated alumina, silica, titania, zirconia, boria, aluminophosphate, or any combination thereof.

Embodiment 6

The method defined in any preceding embodiment, wherein the liquid medium comprises a reducing agent; and wherein the at least one additive comprises 4 Å molecular sieves, zeolites, silica-alumina, silica-titania, silica-zirconia, charcoal, clay, or any combination thereof.

Embodiment 7

The method defined in any preceding embodiment, wherein the catalyst to additive ratio is between 0.1 to 10 and 0.5 to 3.

Embodiment 8

A method of preparing a catalyst slurry comprising the acts of: contacting, under non-polymerization conditions in a mix tank, at least one chromium-based olefin polymerization catalyst, and a liquid medium comprising a reducing agent to produce a primary catalyst slurry comprising catalyst poisons; and passing a liquid of the primary catalyst slurry through a fixed bed or column to remove catalyst poisons.

Embodiment 9

The method defined in embodiment 8, wherein the fixed bed or column is in a separate vessel, and the liquid of the catalyst slurry is returned to the mix tank after treatment.

Embodiment 10

The method defined in embodiment 8 or embodiment 9, wherein the fixed bed or column is in a separate vessel, and the liquid of the catalyst slurry is used for flush points to a polymerization reactor and replaced in the slurry mix tank with fresh liquid to maintain a desired slurry concentration.

Embodiment 11

The method defined in any one of embodiments 8 to 10, wherein the at least one chromium-based olefin polymerization catalyst is chromium oxide on a solid support; wherein the solid support comprises silica, alumina, silica-titania, aluminophosphates, clays, or mixtures thereof.

Embodiment 12

The method defined in any one of embodiments 8 to 11, wherein the fixed column or bed comprises halided or sulfated alumina, silica, titania, zirconia, boria, aluminophosphate, zeolites, silica-alumina, silica-titania, silica-zirconia, charcoal, clay or any combination thereof.

Embodiment 13

The method defined in any one of embodiments 8 to 12, wherein the reducing agent is isobutane, substituted and unsubstituted alkanes, toluene, olefins, and alkynes, or any combination thereof.

Embodiment 14

The method defined in any one of embodiments 8 to 12, wherein the reducing agent is 1-hexene.

Embodiment 15

A method of polymerizing olefins, comprising: contacting, within a liquid medium under non-polymerization conditions in a mix tank, at least one chromium-based olefin polymerization catalyst and at least one additive capable of increasing the activity of the at least one chromium-based olefin polymerization catalyst to produce a contact product; and introducing the contact product, as needed, into a polymerization reactor containing at least one olefin monomer under polymerization conditions.

Embodiment 16

The method defined in embodiment 15, wherein the liquid medium comprises a reducing agent; and wherein the at least one additive comprises 4 Å molecular sieves, zeolites, silica-alumina, silica-titania, silica-zirconia, charcoal, clay, or any combination thereof.

Embodiment 17

The method defined in embodiment 15 or embodiment 16, wherein the at least one additive comprises a metal alkyl cocatalyst comprising alkyl-containing derivatives of at least one of aluminum, boron, magnesium, zinc, and lithium, or any combination thereof.

Embodiment 18

The method defined in any one of embodiments 15 to 17, wherein at least one olefin monomer comprises ethylene.

Embodiment 19

The method defined in any one of embodiments 15 to 18, wherein the at least one chromium-based olefin polymerization catalyst is chromium oxide on a solid support; wherein the solid support comprises silica, alumina, silica-titania, aluminophosphates, clays, or mixtures thereof.

Embodiment 20

The method defined in any one of embodiments 15 to 19, wherein the at least one additive comprises a Lewis acid and the liquid medium comprises a reducing agent; wherein the Lewis acid comprises a SSA comprising at least one of halided or sulfated alumina, silica, titania, zirconia, boria, aluminophosphate, or any combination thereof.

Embodiment 21

A liquid medium purification system, comprising: a vessel; an additive disposed within the vessel; a mix tank fluidly connected to the vessel, wherein the mix tank is configured to deliver a catalyst slurry comprising a catalyst, a liquid medium, and a catalyst poison to the vessel; and wherein the additive disposed within the vessel is capable of absorbing the catalyst poison.

Embodiment 22

The liquid medium purification system defined in embodiment 21, comprising: a filter disposed within a line fluidly connecting the mix tank and the vessel, wherein the filter is capable of separating the catalyst from the liquid medium and the catalyst poison of the catalyst slurry.

Embodiment 23

The liquid medium purification system defined in embodiment 21 or embodiment 22, comprising a bed disposed within the vessel, wherein the bed comprises the additive disposed within the vessel.

Embodiment 24

The liquid medium purification system defined in any one of embodiments 21 to 23, wherein the vessel is a fixed column; and wherein the additive disposed within the vessel comprises a solid particle packed within the vessel.

Embodiment 25

The liquid medium purification system defined in any one of embodiments 21 to 24, wherein the additive disposed within the vessel comprises any one or a combination of halided or sulfated alumina, silica, titania, zirconia, boria, aluminophosphates, zeolites, silica-alumina, silica-titania, silica-zirconia, aluminophosphates, charcoal, clay, or molecular sieves.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A method of preparing a catalyst slurry as a supply for a polymerization reactor comprising the acts of:
    combining, at least one chromium-based olefin polymerization catalyst and at least one additive capable of increasing an activity of the chromium-based olefin polymerization catalyst within a liquid medium to form a catalyst slurry;
    wherein the combining results in contacting the at least one chromium-based olefin polymerization catalyst and the at least one additive under non-polymerization conditions in a mix tank upstream of a run tank; and
    directing the catalyst slurry to the run tank for storage or eventual supply to a polymerization reactor.

2. The method of claim 1, wherein the at least one chromium-based olefin polymerization catalyst is chromium oxide on a solid support;
    wherein the solid support comprises silica, alumina, silica-titania, aluminophosphates, clays, or mixtures thereof.

3. The method of claim 1, wherein the at least one additive comprises one or more metal alkyl cocatalysts selected from alkyl-containing derivatives of at least one of aluminum, boron, magnesium, zinc, and lithium, or any combination thereof.

4. The method of claim 1, wherein the at least one additive comprises a Lewis acid and the liquid medium comprises a reducing agent.

5. The method of claim 4, wherein the Lewis acid comprises a SSA comprising at least one of:
halided or sulfated alumina, silica, titania, zirconia, boria, aluminophosphate, or any combination thereof.

6. The method of claim 1, wherein the liquid medium comprises a reducing agent; and
wherein the at least one additive comprises 4 Å molecular sieves, zeolites, silica-alumina, silica-titania, silica-zirconia, charcoal, clay, or any combination thereof.

7. The method of claim 1, wherein the catalyst to additive ratio is between 0.1 to 10 and 0.5 to 3.

8. A method of preparing a catalyst slurry comprising the acts of:
contacting, under non-polymerization conditions in a mix tank, at least one chromium-based olefin polymerization catalyst, and a liquid medium comprising a reducing agent to produce a primary catalyst slurry comprising catalyst poisons; and
passing a liquid of the primary catalyst slurry through one or more vessels comprising a porous medium capable of removing the catalyst poisons from the liquid.

9. The method of claim 8, wherein the liquid of the catalyst slurry is returned to the mix tank after treatment.

10. The method of claim 8, wherein the liquid of the catalyst slurry is used for flush points to a polymerization reactor and replaced in the mix tank with fresh liquid to maintain a desired slurry concentration.

11. The method of claim 8, wherein the at least one chromium-based olefin polymerization catalyst is chromium oxide on a solid support;
wherein the solid support comprises silica, alumina, silica-titania, aluminophosphates, clays, or mixtures thereof.

12. The method according to claim 8, wherein the porous medium comprises halided or sulfated alumina, silica, titania, zirconia, boria, aluminophosphate, zeolites, silica-alumina, silica-titania, silica-zirconia, charcoal, clay or any combination thereof.

13. The method according to claim 8, wherein the reducing agent comprises isobutane, substituted and unsubstituted alkanes, toluene, olefins, and alkynes, or any combination thereof.

14. The method according to claim 8, wherein the reducing agent comprises 1-hexene.

15. The method according to claim 8, wherein the one or more vessels comprise a fixed bed having the porous medium.

16. The method according to claim 8, wherein the one or more vessels comprise a column having the porous medium.

17. The method according to claim 8, wherein the porous medium comprises a SSA or Lewis acid.

* * * * *